United States Patent
Fujimoto et al.

(10) Patent No.: US 7,069,385 B2
(45) Date of Patent: Jun. 27, 2006

(54) CLUSTER-TYPE STORAGE SYSTEM AND MANAGING METHOD OF THE CLUSTER-TYPE STORAGE SYSTEM

(75) Inventors: Kazuhisa Fujimoto, Kokubunji (JP); Mutsumi Hosoya, Fujimi (JP); Kentaro Shimada, Tokyo (JP); Akira Yamamoto, Sagamihara (JP); Naoko Iwami, Machida (JP); Yasutomo Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/795,719

(22) Filed: Mar. 9, 2004

(65) Prior Publication Data

US 2004/0221105 A1    Nov. 4, 2004

Related U.S. Application Data

(63) Continuation-in-part of application No. 10/422,734, filed on Apr. 25, 2003.

(30) Foreign Application Priority Data

Nov. 26, 2002 (JP) ............................. 2002-341664
Jan. 14, 2003 (JP) ............................. 2003-005245
Nov. 21, 2003 (JP) ............................. 2003-391620

(51) Int. Cl.
*G06F 12/00* (2006.01)

(52) U.S. Cl. ........................... 711/119; 710/11; 710/64; 710/65; 711/130

(58) Field of Classification Search .................. 711/4, 711/112, 113, 114, 118, 202; 709/218, 227, 709/230, 231, 244, 249, 250
See application file for complete search history.

(56) References Cited

U.S. PATENT DOCUMENTS

| 5,469,548 | A | 11/1995 | Callison et al. |
| 6,289,398 | B1 | 9/2001 | Stallmo et al. |
| 6,385,681 | B1 | 5/2002 | Fujimoto et al. |
| 6,542,954 | B1 | 4/2003 | Aruga |
| 6,542,961 | B1 * | 4/2003 | Matsunami et al. ........ 711/114 |
| 6,606,698 | B1 | 8/2003 | Fradette |
| 6,708,232 | B1 | 3/2004 | Obara |
| 6,813,676 | B1 | 11/2004 | Henry et al. |

(Continued)

FOREIGN PATENT DOCUMENTS

JP    7-152491    11/1993

(Continued)

*Primary Examiner*—Donald Sparks
*Assistant Examiner*—Jesse Diller
(74) *Attorney, Agent, or Firm*—Reed Smith LLP; Stanley P. Fisher, Esq.; Juan Carlos A. Marquez, Esq.

(57) ABSTRACT

A storage system 1 includes: plural protocol transformation units 10 that transform, to a protocol within the system, a read/write protocol of data exchanged with servers 3 or hard disk groups 2; plural cache control units 21 that include cache memory units 111 storing data read/written with the servers 3 or the hard disk groups 2 and which include the function of controlling the cache memory units 111; and an interconnection network 31 that connects the protocol transformation units 10 and the cache control units 21. In this storage system 1, the plural cache control units 21 are divided into plural control clusters 70, control of the cache memory units 111 is independent inside the control clusters, and a system management unit 60 that manages, as a single system, the plural protocol transformation units 10 and the plural control clusters 70 is connected to the interconnection network 30.

17 Claims, 29 Drawing Sheets

U.S. PATENT DOCUMENTS

| | | |
|---|---|---|
| 2002/0004845 A1 | 1/2002 | Yamamoto et al. |
| 2002/0091898 A1 | 7/2002 | Matsunami et al. |
| 2003/0093541 A1 | 5/2003 | Lolayekar et al. |
| 2003/0099254 A1 | 5/2003 | Richter |
| 2003/0130999 A1 | 7/2003 | Probert, Jr. et al. |
| 2003/0236945 A1 | 12/2003 | Nahum |
| 2004/0010660 A1 | 1/2004 | Konshak et al. |
| 2004/0098529 A1 | 5/2004 | Sangveraphunski et al. |
| 2004/0103244 A1* | 5/2004 | Fujimoto et al. ........... 711/113 |
| 2004/0221105 A1 | 11/2004 | Fujimoto et al. |

FOREIGN PATENT DOCUMENTS

| | | |
|---|---|---|
| JP | 9-51347 | 8/1995 |
| JP | 2000-99281 | 9/1998 |
| JP | 2000-242434 | 12/1999 |

* cited by examiner

FIG. 12

| VVOL2 # | PA # | VVOL1 # | PDEV # | RAID CLASS | CAPACITY |
|---|---|---|---|---|---|
| 0 | 0 | 0 | 0,1,2,3 | 5 | 240 GB |
| 1 | | 2 | 8,9,A,B | 5 | 240 GB |
| ⋮ | | ⋮ | ⋮ | ⋮ | ⋮ |
| 8 | 1 | 1 | 4,5,6,7 | 1 | 160 GB |
| 9 | | 3 | C,D,E,F | ⋮ | 320 GB |
| ⋮ | | ⋮ | ⋮ | ⋮ | ⋮ |

FIG. 13

| VVOL3 # | VVOL2 # | CA # | ADDRESS WITHIN VVOL 1 | CAPACITY |
|---|---|---|---|---|
| 00 | 0 | 0 | 0x000000000000~0x03FFFFFFFF | 16 GB |
| .. | .. | .. | .. | .. |
| 0F | 8 | 0 | 0x3000000000000~0x3FFFFFFFFF | 16 GB |
| .. | .. | .. | .. | .. |
| A0 | | 1 | 0x000000000000~0x00FFFFFFFF | 4 GB |
| .. | .. | .. | .. | .. |

FIG. 14

| ACTUAL LAN | VVOL3 # | RAID CLASS | CA # | CAPACITY |
|---|---|---|---|---|
| 0 | 00 | 5 | 0 | 16 GB |
| 1 | 01,02 | 5 | | 32 GB |
| 2 | 03 | 0 | | 16 GB |
| ⋮ | ⋮ | ⋮ | | ⋮ |
| B | A0,A1,A2 | 1 | 1,2 | 12 GB |
| ⋮ | ⋮ | ⋮ | ⋮ | ⋮ |

| SERVER # | VIRTUAL LUN | ACTUAL LUN | PA # | CHANNEL # | CA # |
|---|---|---|---|---|---|
| 0 | LUNa 0,1,2,3 | 0,1,3,8 | 0 | 0 | 0 |
| 1 | LUNb 0,1,2 | 2,4,5 | 1 | 1 | 0 |
| 2 | LUNc 0,1,2,3,4 | 6,7,9,A,F | 0 | 0 | 1 |
| ⋮ | ⋮ | ⋮ | ⋮ | ⋮ | ⋮ |

654

CLUSTER-TYPE STORAGE SYSTEM AND MANAGING METHOD OF THE CLUSTER-TYPE STORAGE SYSTEM

CROSS-REFERENCE TO RELATED APPLICATION

This application relates to and claims priority from Japanese Patent Application No. 2003-391620, filed on Nov. 21, 2003, the entire disclosure of which is incorporated herein by reference.

This application is a Continuation-in-Part of Non-Provisional application Ser. No. 10/422,734 filed Apr. 25, 2003. Priority is claimed based on Japanese Patent Application No. 2003-391620 filed Nov. 21, 2003 and U.S. application Ser. No. 10/422,734 filed Apr. 25, 2003 which claims the priority dates of Japanese Patent Application Nos. 2003-005245 and 2002-341664, filed Jan. 14, 2003, and Nov. 26, 2002, respectively.

BACKGROUND OF THE INVENTION

1. Field of the Invention

The present invention relates to a storage system that is expandable from a small-scale to a large-scale configuration and to a managing method of the storage system.

2. Description of the Related Art

Storage systems that save data processed in IT systems have come to play a central role in IT systems due to the penetration of IT systems in business and the expansion of the portability of IT systems in business resulting from the development of the Internet. There are numerous types of storage systems ranging from systems of a small-scale configuration to systems of a large-scale configuration.

As one example of a main storage system that provides a small-scale to large-scale configuration, in the prior art, an architecture storage system such as shown in FIG. 2 is disclosed in JP-A-2000-99281. This storage system 8 is disposed with plural channel IF units 11 that execute data transfer with computers 3 (also called "servers" below), plural disk IF units 16 that execute data transfer with hard disk groups 2, a cache memory unit 14 that temporarily stores data stored in the hard disk groups 2, and a control memory unit 15 that stores control information relating to the storage system 8 (e.g., information relating to data transfer control in the storage system 8 and management information of data stored in the hard disk groups 2). The channel IF units 11, the disk IF units 16 and the cache memory unit 14 are connected by an interconnection network 41, and the channel IF units 11, the disk IF units 16 and the control memory unit 15 are connected by an interconnection network 42. Also, the interconnection network 41 and the interconnection network 42 are configured by common buses and switches.

In this manner, in the single storage system 8, the cache memory unit 14 and the control memory unit 15 have a configuration that is accessible from all of the channel IF units 11 and the disk IF units 16.

The channel IF units 11 include an interface (host IF) 104 for connecting to the servers 3, a microprocessor 103 that controls input/output with respect to the servers 3, a memory access unit 106 that controls access to the cache memory unit 14, and a memory access unit 107 that controls access to the control memory unit 15. Also, the disk IF units 16 include an interface (disk IF) 105 for connecting to the hard disk groups 2, a microprocessor 103 that controls input/output with respect to the hard disk groups 2, a memory access unit 106 that controls access to the cache memory unit 14, and a memory access unit 107 that controls access to the control memory unit 15. The disk IF units 16 also conduct control of RAID.

In the above-described storage system, it has been possible to flexibly change the number of channel IF units 11 and disk IF units 16 because the channel IF units 11 that control data transfer with the servers 3 and the disk IF units 16 that control data transfer with the hard disk groups 2 are separated and data transfer between the channel IF units 11 and the disk IF units 16 is controlled via the cache memory unit 14 and the control memory unit 15. For this reason, it has been possible for the storage system to have a small-scale to large-scale configuration.

Also, in the prior art disclosed in JP-A-2000-242434, as shown in FIG. 21, plural disk array devices 4 are connected to plural servers 3 via disk array switches 5 so that the plural disk array devices 4 are managed as a single storage system 9 by system configuration managing means 60 connected to the disk array switches 5 and each disk array device 4.

SUMMARY OF THE INVENTION

In large corporations represented by banks, securities companies and telephone companies, there has been a trend to reduce expenditures necessary to run, maintain and manage computer systems and storage systems by configuring computer systems and storage systems that had conventionally been dispersed in various places into computer systems and storage systems concentrated within a data center.

Additionally, in the midst of the economic slump resulting from effects such as the collapse of the IT bubble, there has been a trend for businesses to curtail initial investments in IT systems and conduct system expansion in response to expansions in business scale. For this reason, scalability of performance and costs with which it is possible to curtail initial investments and expand scale with reasonable investments commensurate with business scale is being demanded of storage systems.

In the prior art shown in FIG. 2, all of the channel IF units 11 and all of the disk IF units 16 execute the reading/writing of data from the servers 3 to the hard disk groups 2 by controlling data transfer between the channel IF units 11 and the disk IF units 16 via the cache memory unit 14 and the control memory unit 15. For this reason, the access load from all of the channel IF units 11 and all of the disk IF units 16 is concentrated on the cache memory unit 14 and the control memory unit 15.

The performance (data input/output frequency per unit of time and data transfer amount per unit of time) demanded of storage systems is increasing year by year. In order to accommodate this in the future, it is necessary to also improve the data transfer processing performance of the channel IF units 11 and the disk IF units 16.

As described above, all of the channel IF units 11 and all of the disk IF units 16 control data transfer between the channel IF units 11 and the disk IF units 16 via the cache memory unit 14 and the control memory unit 15. Thus, there have problems in that, when the data transfer processing performance of the channel IF units 11 and the disk IF units 16 is improved, the access load on the cache memory unit 14 and the control memory unit 15 increases, which becomes a bottleneck, and it becomes difficult to improve the performance of the storage system 8 in the future.

It is possible to improve allowable access performance by increasing the scale of the cache memory unit 14 and the control memory unit 15. However, in order to make the cache memory unit 14 and the control unit 15 accessible from all of the channel IF units 11 and disk IF units 16, it is necessary to respectively manage the cache memory unit 14 and the control memory unit 15 as a single shared memory space. Thus, there have been problems in that, when the scale of the cache memory unit 14 and the control memory unit 15 is increased, it is difficult to reduce the cost of the storage system with respect to a small-scale configuration, and it becomes difficult to provide a system of a small-scale configuration at a low cost.

Also, in the prior art shown in FIG. 21, the numbers of connectable disk array devices 4 and servers 3 can be increased by increasing the number of ports of the disk array switches 5 and connecting plural disk array switches 5 in multi-stages, so that a storage system 9 that can scalably accommodate a small-scale to large-scale configuration can be provided. However, there have been problems in that, because the servers 3 access the disk array devices 4 via the disk array switches 5, processing to convert the protocol between the servers 3 and the disk array switches 5 to the protocol in the disk array switches 5 at interface portions with the servers 3 in the disk array switches 5 and to convert the protocol in the disk array switches 5 to the protocol between the disk array switches 5 and the disk array devices 4 at interface portions with the disk array devices 4 in the disk array switches 5 arises, so that response performance is inferior in comparison to a case where it is possible to directly access the disk array devices 4 without the intervention of the disk array switches 5.

The above-described problems are solved by a storage system comprising: plural protocol transformation units that include interfaces with an external device and convert, to a protocol within the system, a read/write protocol of data exchanged with the external device; plural cache control units that include cache memories that stores data read/written with the external device and which include the function of controlling the cache memories; and an interconnection network that interconnects the plural protocol transformation units and the plural cache control units, wherein the plural cache control units are divided into plural control clusters, control of the cache memories is independent inside the control clusters, and a system management unit manages, as a single system, the plural protocol transformation units and the plural control clusters.

The storage system may be configured so that interconnection network is divided into a third interconnection network that transfers data read/written with the external device and a fourth interconnection network that transfers control information for managing the storage system, with the system management unit being connected to the fourth interconnection network.

The storage system may also be configured so that the cache control units and second protocol transformation units are mounted on a same board.

Moreover, the storage system may be configured so that at least one external device that conducts data processing and at least one second storage system are connected to the interfaces with the external device of plural first protocol transformation units, and input/output of data from the external device conducting data processing to the second storage system is conducted by conducting data transfer, via the interconnection network, between the first protocol transformation units to which the external device conducting data processing is connected and the first protocol transformation units to which the second storage system is connected.

Also, the storage system may be configured so that the system management unit includes the function of managing, as a volume of the storage system, a logical volume that the second storage system provides and providing the logical volume to the external device including the data processing function.

Problems and solutions that the present application discloses will be made apparent through the embodiments of the invention and the drawings.

BRIEF DESCRIPTION OF THE DRAWINGS

FIG. 12 is a diagram showing an example of a management table;

FIG. 13 is a diagram showing an example of a management table;

FIG. 14 is a diagram showing an example of a management table;

FIG. 15 is a diagram showing an example of a management table;

DESCRIPTION OF THE PREFERRED EMBODIMENTS

Embodiments of the invention will be described below using the drawings.

Figure 1:
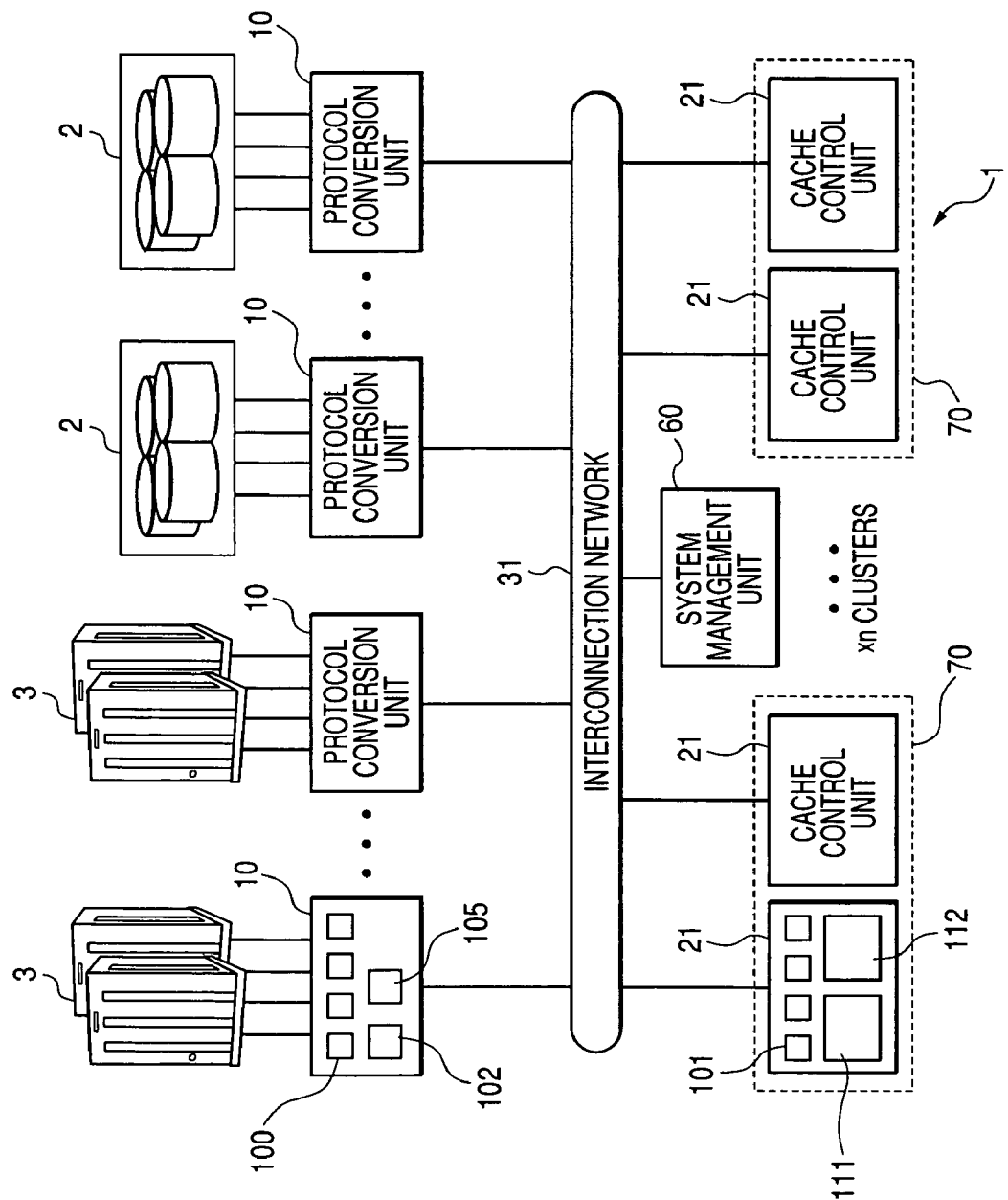
FIG. 1 is a diagram showing an example of the configuration of a storage system.

As shown in FIG. 1, a storage system 1 includes protocol transformation units 10 that are interface units with servers 3 or hard disk groups 2, cache control units 21, a system management unit 60 and hard disk groups 2. The protocol transformation units 10, the cache control units 21 and the system management unit 60 are connected via an interconnection network 31.

Figure 6:
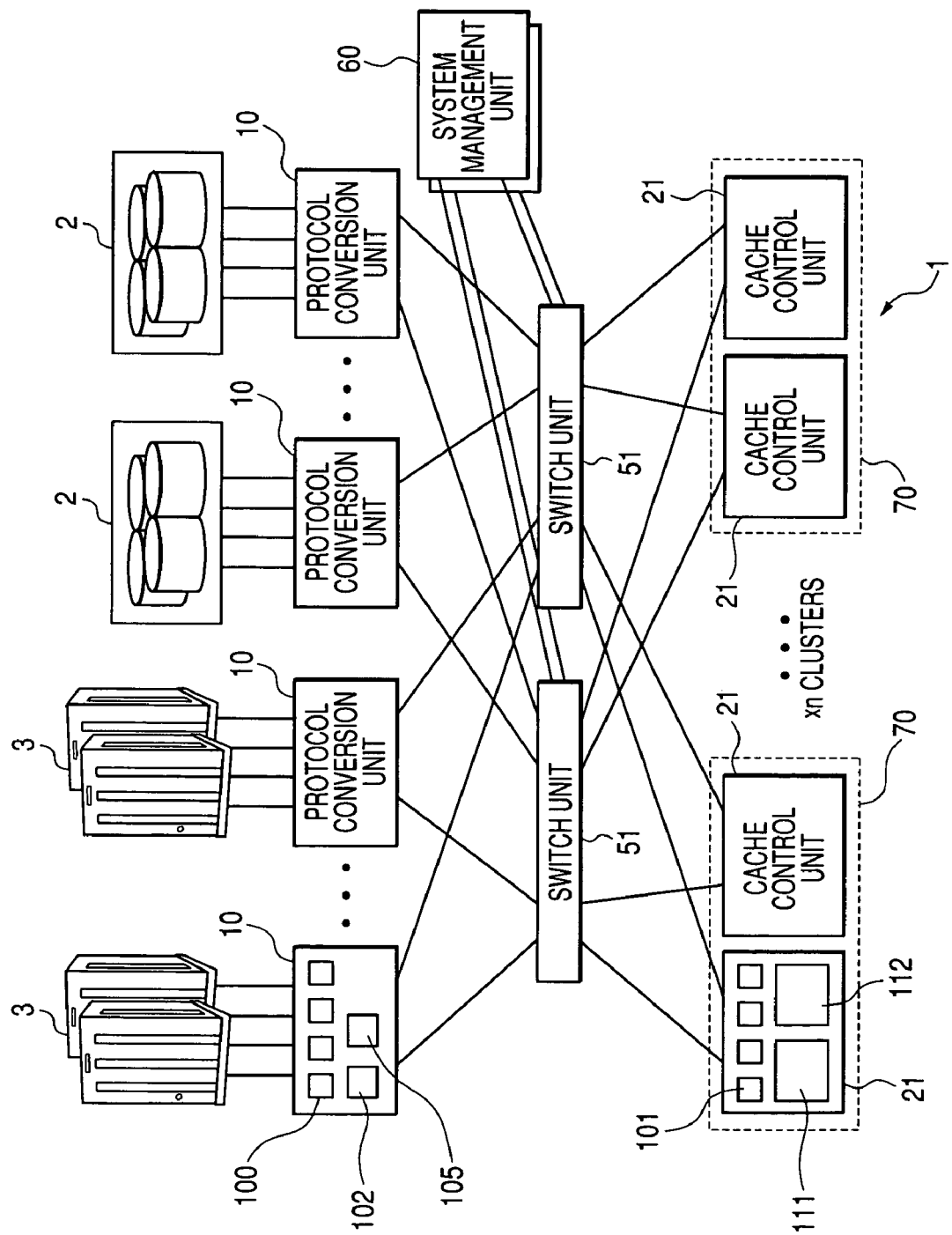
FIG. 6 is a diagram showing an example of the detailed configuration of an interconnection network.

An example of the specific configuration of the interconnection network 31 is shown in FIG. 6.

The interconnection network 31 includes two switch units 51. One path each is connected to the two switch units 51 from the protocol transformation units 10, the cache control units 21 and the system management unit 60. Thus, two paths are secured between the protocol transformation units 10, the cache control units 21 and the system management units 60, so that it becomes possible to raise reliability. Also the system management unit 60 is redundant. Thus, it becomes possible to raise the reliability of the entire system. Here, the aforementioned numbers only constitute one example, and the numbers are not intended to be limited to the aforementioned numbers.

Also, although an interconnection network using switches is shown as an example, it suffices as long as the network is interconnected and control information and data are transferred. For example, the interconnection network may also be configured by a bus.

Figure 8:
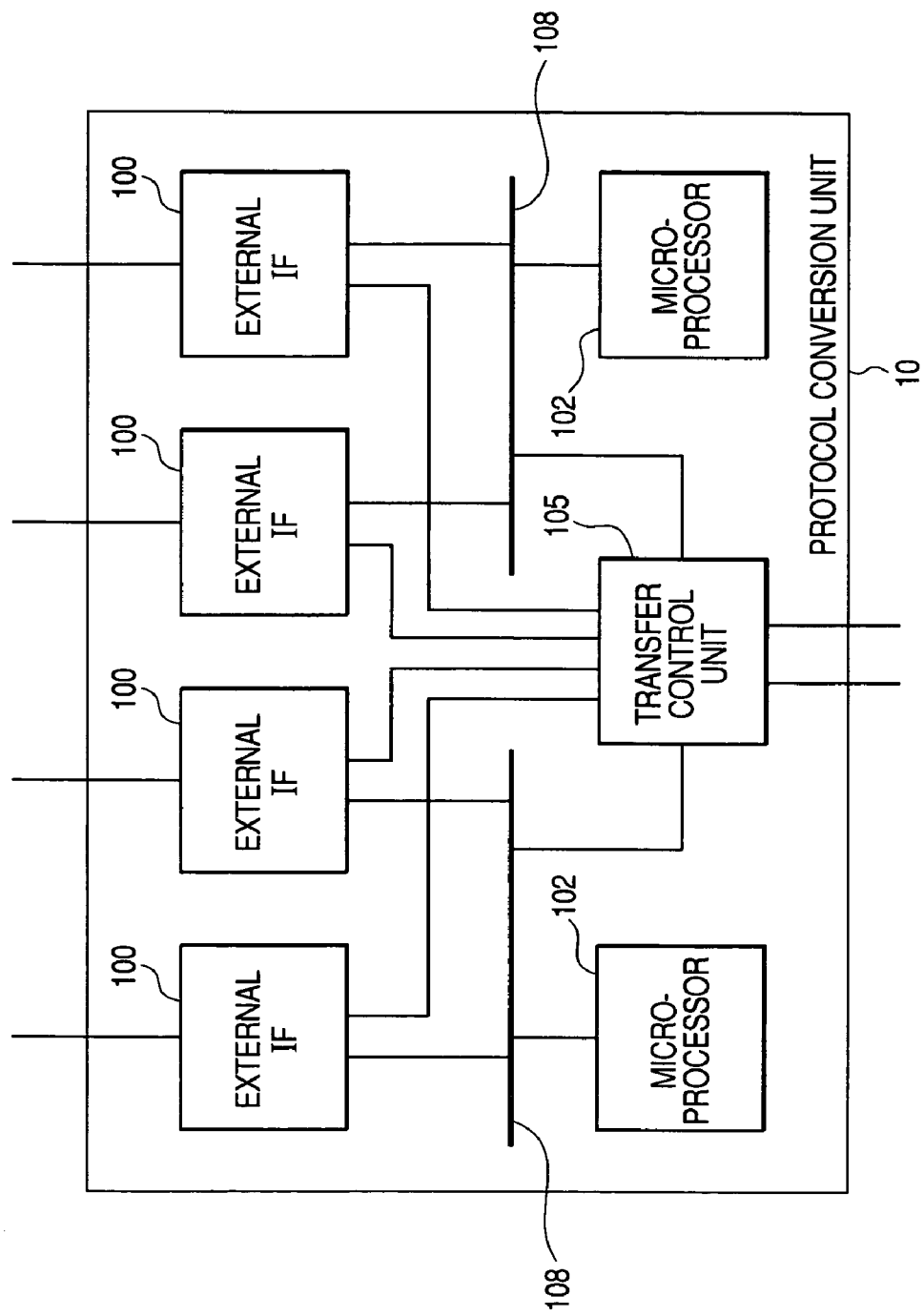
FIG. 8 is a diagram showing an example of the configuration of a protocol transformation unit.

A specific example of the protocol transformation unit 10 is shown in FIG. 8.

The protocol transformation unit 10 includes at least four IF (external IF) 100 with the servers 3 or the hard disk groups 2, a transfer control unit 105 that controls the transfer of data/control information with the cache control unit 21 or the system management unit 60, and two microprocessors 102. Each microprocessor 102 includes a memory (not shown) connected to itself as a main memory.

Here, the aforementioned numbers only constitute one example, and the numbers are not intended to be limited to the aforementioned numbers. Numbers in all of the description below are only exemplary and are not intended to limit the invention.

The microprocessors 102 are connected by shared buses 108 to the external IF 100 and the transfer control unit 105. Also, the external IF 100 are directly connected to the transfer control unit 105. The microprocessors 102 control the external IF 100 and the transfer control unit 105, whereby the microprocessors 102 inter-transform the read/write protocol of data between the external IF 100 and the servers 3 or the hard disk groups 2 and the data transfer protocol between the cache control units 21 or the system management unit 60 and the transfer control unit 105. Thus, the protocol transformation units 10 transfer read/write requests from the servers 3 to a target cache control unit 21 or another protocol transformation unit 10. Also, the protocol transformation units 10 execute processing to transfer, to the hard disk groups 2, read/write requests from the cache control units 21 or another protocol transformation unit 10.

Here, the connection configuration between the microprocessors 102, the external IF 100 and the transfer control unit 105 constitutes only one example, and the configuration is not intended to be limited to the above. There is no problem as long as it has a configuration where the microprocessors 102 can control the external IF 100 and the transfer control unit 105 and can transfer data from the external IF 100 to the transfer control unit 105.

Figure 9:
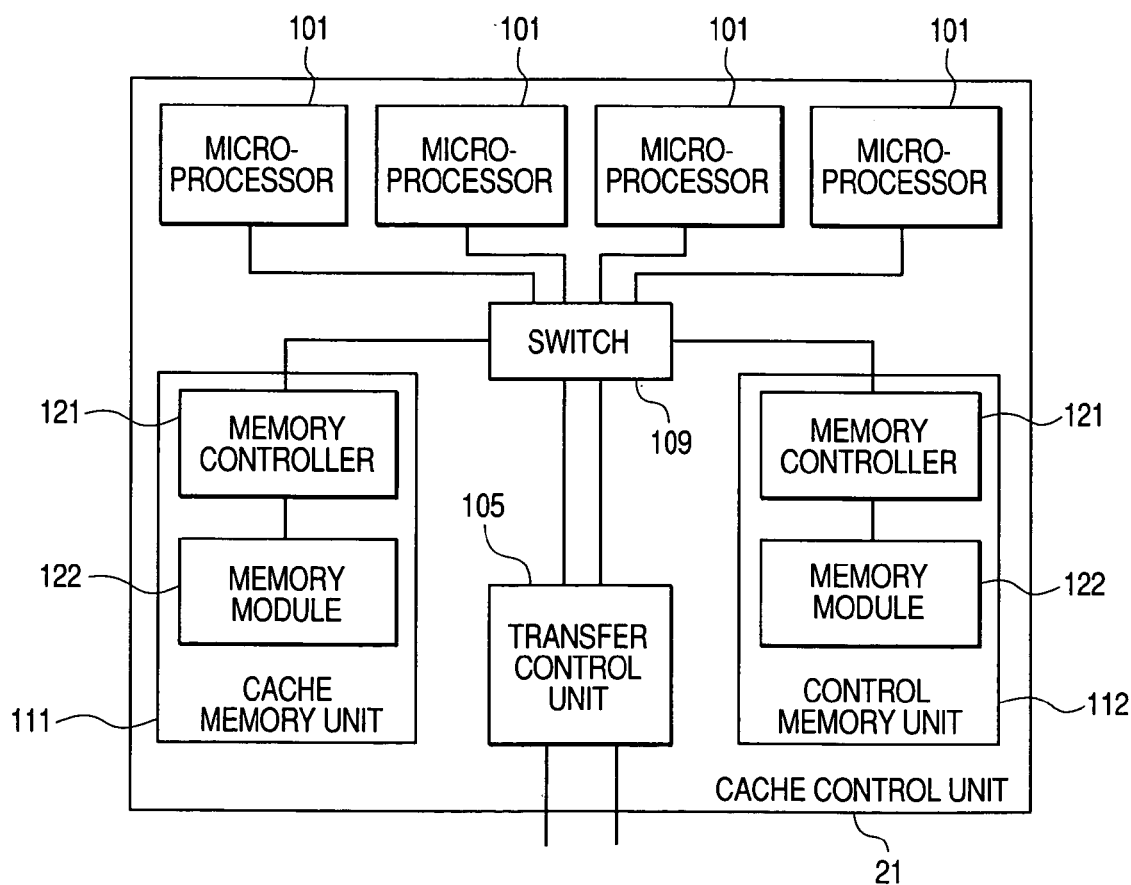
FIG. 9 is a diagram showing an example of the configuration of a cache control unit.

A specific example of the cache control unit 21 is shown in FIG. 9.

The cache control unit 21 includes at least four microprocessors 101, a transfer control unit 105 that controls the transfer of data/control information with the protocol transformation units 10 or the system management unit 60, a cache memory unit 111 that temporarily stores data exchanged with the servers 3 or the hard disk groups 2, and a control memory unit 112 that stores control information relating to data transfer, management of the cache memory unit 111 and management of the hard disk groups 2. Each of the cache memory unit 111 and the control memory unit 112 includes a memory module 122 and a memory controller 121 that controls access to the memory module 122. Here, there is no problem if the cache memory unit 111 and the control memory unit 112 each have the same memory controller 121 and memory module 122 and if a cache memory region and a control memory region are allocated to different regions on a single memory space. Also, each microprocessor 101 includes a memory (not shown) connected to itself as a main memory. Alternatively, there is no problem if the four microprocessors have an SMP configuration where they share the cache memory unit 111 and the control memory unit 112 as their own main memory.

The microprocessors 101, the cache memory unit 111, the control memory unit 112 and the transfer control unit 105 are connected via a switch 109. The microprocessors 101 use control information stored in the control memory unit 112 to control the reading/writing of data to the cache memory, directory management of the cache memory, data transfer with the protocol transformation units 10 and the exchange of system management information with the system management unit 60. The microprocessors 101 also execute so-called RAID processing, or redundant processing of data written to the hard disk groups 2 connected to the protocol transformation units 10. There is no problem if this RAID processing is also executed in the protocol transformation units 10.

Here, the connection configuration between the microprocessors 101, the cache memory unit 111, the control memory unit 112 and the transfer control unit 105 constitutes only one example, and the configuration is not intended to be limited to the above. There is no problem as long as it has a configuration where the microprocessors 101 can control the cache memory unit 111, the control memory unit 112 and the transfer control unit 105.

Figure 22:
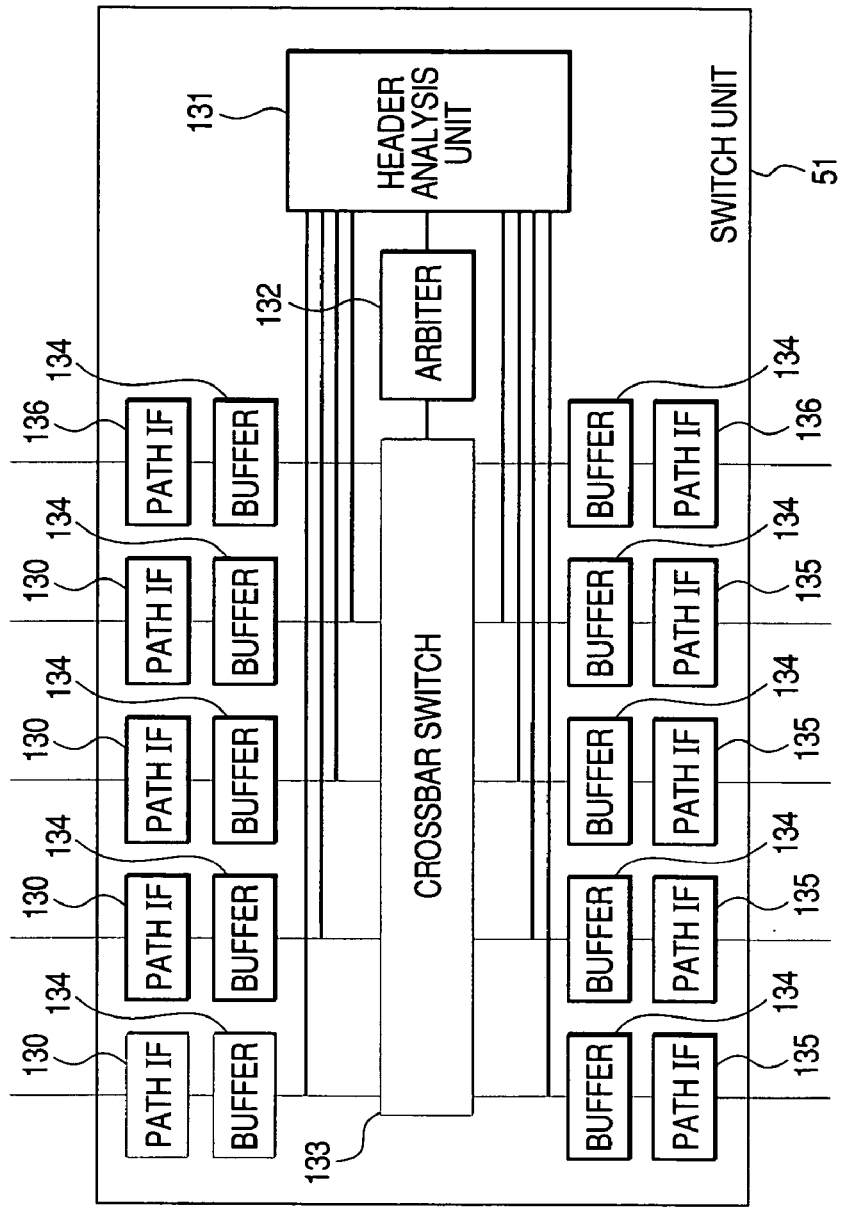
FIG. 22 is a diagram showing an example of the configuration of a switch unit.

A specific example of the switch unit 51 is shown in FIG. 22.

The switch unit 51 includes at least four path IF 130, a header analysis unit 131, an arbiter 132, a crossbar switch 133, ten buffers 134, four path IF 135 and two path IF 136.

The path IF 130 are IF that connect a connection path with the protocol transformation units 10, and one path each is connected from the four protocol transformation units 10. The path IF 135 are IF that connect a connection path with the cache control units 21, and one path each to the four cache control units 21 is connected. The buffers 134 buffer packets transferred between the protocol transformation units 10, the cache control units 21 and the system management unit 60.

Figure 23:
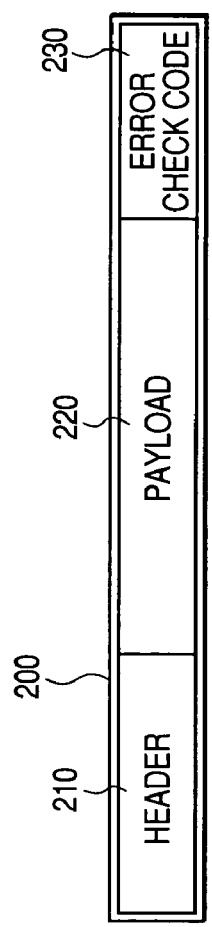
FIG. 23 is a diagram showing an example of a packet format.

An example of the format of the packets transferred between the protocol transformation units 10, the cache control unit 21 and the system management unit 60 is shown in FIG. 23. A packet 200 includes a header 210, a payload 220 and an error check code 230. At least information representing the transmission source and the transmission destination of the packet is stored in the header 210. A command, an address, data and a status are stored in the payload 220. The error check code 230 is a code for detecting error within the packet at the time the packet is transferred. When the packet is inputted to the path IF 130, 135 and 136, the header 210 of the packet is sent to the header analysis unit 131. In the header analysis unit 131, a request to connect the path IF is determined from the transmission destination of the packet of the path IF, and this connection request is sent to the arbiter 132. In the arbiter 132, arbitration is conducted on the basis of the connection request from the path IF and, on the basis of the result, a signal representing connection switching is outputted with respect to the crossbar switch 133 to switch the connection in the crossbar switch 133. Here in the present embodiment, the switch unit 51 is configured to have a buffer at each path IF, but there is no problem if it is configured so that the switch unit 51 has a single large buffer and allocates packet storage regions to each path IF from therein. Also, error information within the switch unit 51 is stored in the header analysis unit 131.

Figure 10:
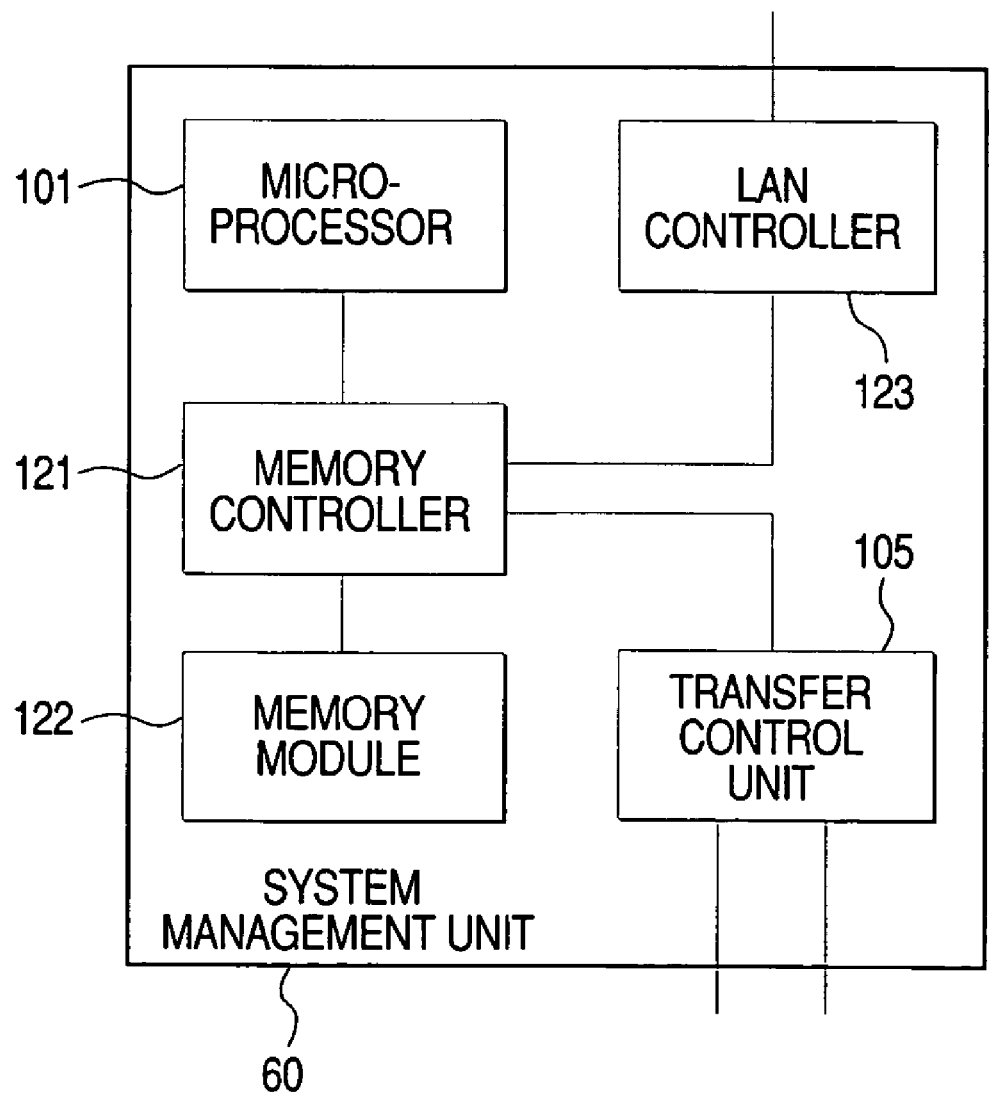
FIG. 10 is a diagram showing an example of the configuration of a system management unit.

A specific example of the system management unit 60 is shown in FIG. 10.

The system management unit 60 includes at least one microprocessor 101, a transfer control unit 105 that controls the transfer of data/control information with the protocol transformation units 10 or the cache control units 21, a memory controller 121, a memory module 122 and a LAN controller 123. The microprocessor 101 uses the memory module 122 as its own main memory. Alternatively, there is no problem if the microprocessor 101 has, separate from the memory module 122, a memory connected to itself as a main memory.

The microprocessor 101 is connected to the memory module 122, the transfer control unit 105 and the LAN controller 123 via the memory controller 121. The microprocessor 101 consolidates the management information of the entire storage system 1 due to management information collected from the protocol transformation units 10 and the cache control units 21, management information of the interconnection network 31 and information that the user sets from a management console connected to the LAN controller 123, and stores this management information in the memory module 122. The microprocessor 101 also uses this information to conduct management of the storage system 1. This management information is saved in the hard disk groups 2 or a nonvolatile memory (not shown) connected to the memory controller 121, whereby it becomes possible to raise the reliability of the storage system 1.

Here, the connection configuration between the microprocessor 101, the memory controller 121, the memory module 122, the LAN controller 123 and the transfer control unit 105 constitutes only one example, and the configuration is not intended to be limited to the above. There is no problem as long as it has a configuration where the microprocessor 101 can control the memory controller 121, the memory module 122, the LAN controller 123 and the transfer control unit 105.

As shown in FIG. 1, in the present embodiment, two cache control units 21 are consolidated as a single control cluster 70, and management of the cache memory units 111 is closed inside the control clusters 70. That is, the microprocessors 101 within the cache control units 21 within a given control cluster 70 manage only the cache memory units 111 and control memory units 112 within that control cluster 70 and do not manage the cache memory units 111 and control memory units 112 within another control cluster 70.

Here, the cache memory units 111 within two cache control units 21 and the control memory units 112 within two cache control units 21 may be doubled. By doing so, it becomes possible to continue operation in another cache control unit 21, whose memory is doubled, in a case where an error arises in one cache control unit 21, so that it becomes possible to improve the reliability of the storage system 1.

In a case where it becomes necessary to multiply store the same data in the cache memory units 111 within plural control clusters 70, the protocol transformation units 10 transferring this data to the cache control units 21 record, in a predetermined region of the memory in the system management unit 60, control information representing which data is multiply stored in the cache memory units 111 of which control clusters 70. At the same time, the protocol transformation units 10 send, together with the data and to the cache control units 21, the control information representing the fact that the data is multiply stored data. In a case where data multiply stored in their cache memory units 111 is updated or deletion, the cache control units 21 send control information representing this fact to the system management unit 60. When the system management unit 60 receives this, it executes processing to update or delete the multiply stored data on the basis of control information representing which data recorded in the memory is multiply stored in the cache memory units 111 of which control clusters 70.

As described above, by limiting, to the insides of the control clusters 70, the range of the cache memory units 111 that the microprocessors 101 within the cache control units 21 control, it becomes possible to reduce the access load on the cache memory units 111 and the control memory units 112 and, as a result, it becomes possible to improve the performance of the storage system 1.

Figure 4:
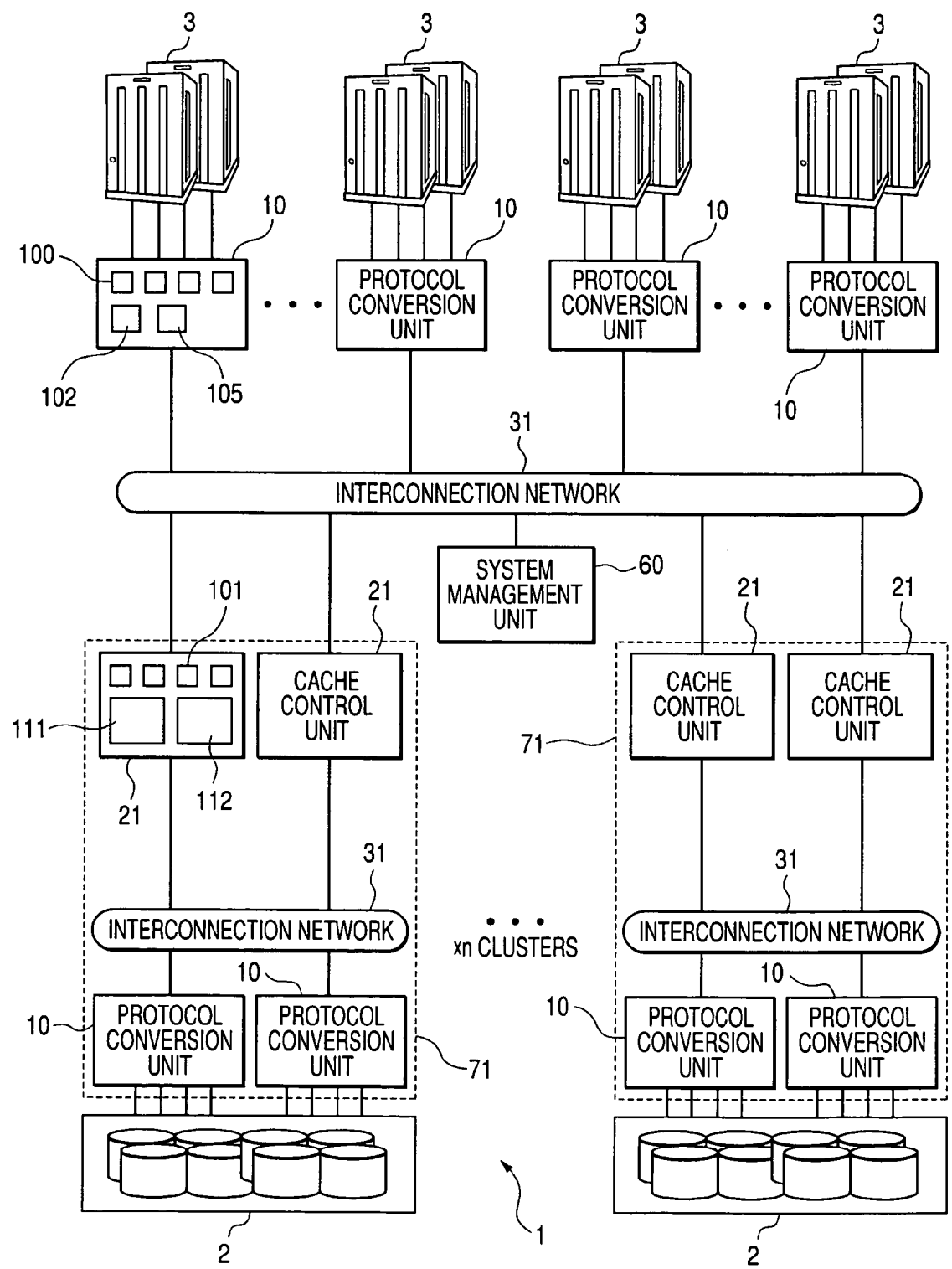
FIG. 4 is a diagram showing an example of a logical configuration of a storage system.

Also, as shown in FIG. 4, a configuration is also conceivable where the protocol transformation units 10 are grouped into protocol transformation units 10 connected to the servers 3 and protocol transformation groups 10 connected to the hard disk groups 2, two cache control units 21 and two protocol transformation units 10 connected to the hard disk groups are consolidated as a single control cluster 71, and only data to be recorded or data already recorded in the hard disk groups 2 connected to the protocol transformation units 10 within that control cluster is stored in the cache memory units 111 within the cache control units 21 of that control cluster 71. At the same time, management of the cache memory units 111 is closed inside the control clusters 71. That is, the microprocessors 101 within the cache control units 21 within a given control cluster 71 manage only the cache memory units 111 within that control cluster 71 and do not manage the cache memory units 111 within another control cluster 71.

Here, although an example is shown in the drawing where the interconnection network 31 to which the protocol transformation units 10 connected to the servers 3 are linked and the interconnection network 31 to which the protocol transformation units 10 connected to the hard disk groups 2 are linked are separated, the protocol transformation units 10 are physically connected to the same interconnection network 31.

Also, the content of the cache memory units 111 and the control memory units 112 may be doubled between two cache control units 21. By doing so, it becomes possible to continue operation in another cache control unit 21, whose memory is doubled, in a case where an error arises in one cache control unit 21, so that it becomes possible to improve the reliability of the storage system 1.

As described above, by limiting, to the insides of the control clusters 71, the range of the cache memory units 111 that the microprocessors 101 within the cache control units 21 control, it becomes possible to reduce the access load on the cache memory units 111 and the control memory units 112 and, as a result, it becomes possible to improve the performance of the storage system 1.

Also, due to the above-described management, data is no longer multiply stored in the cache memory units 111 of plural control clusters 71 in the configuration shown in FIG. 4. Thus, coherence control of data multiply stored in the cache memory units 111 of plural control clusters 70 by the system management unit 60 that had been necessary in the configuration of FIG. 1 becomes unnecessary, the management of the system is simplified, and it becomes possible to further improve the performance of the storage system 1 in comparison to the configuration of FIG. 1.

Figure 30:
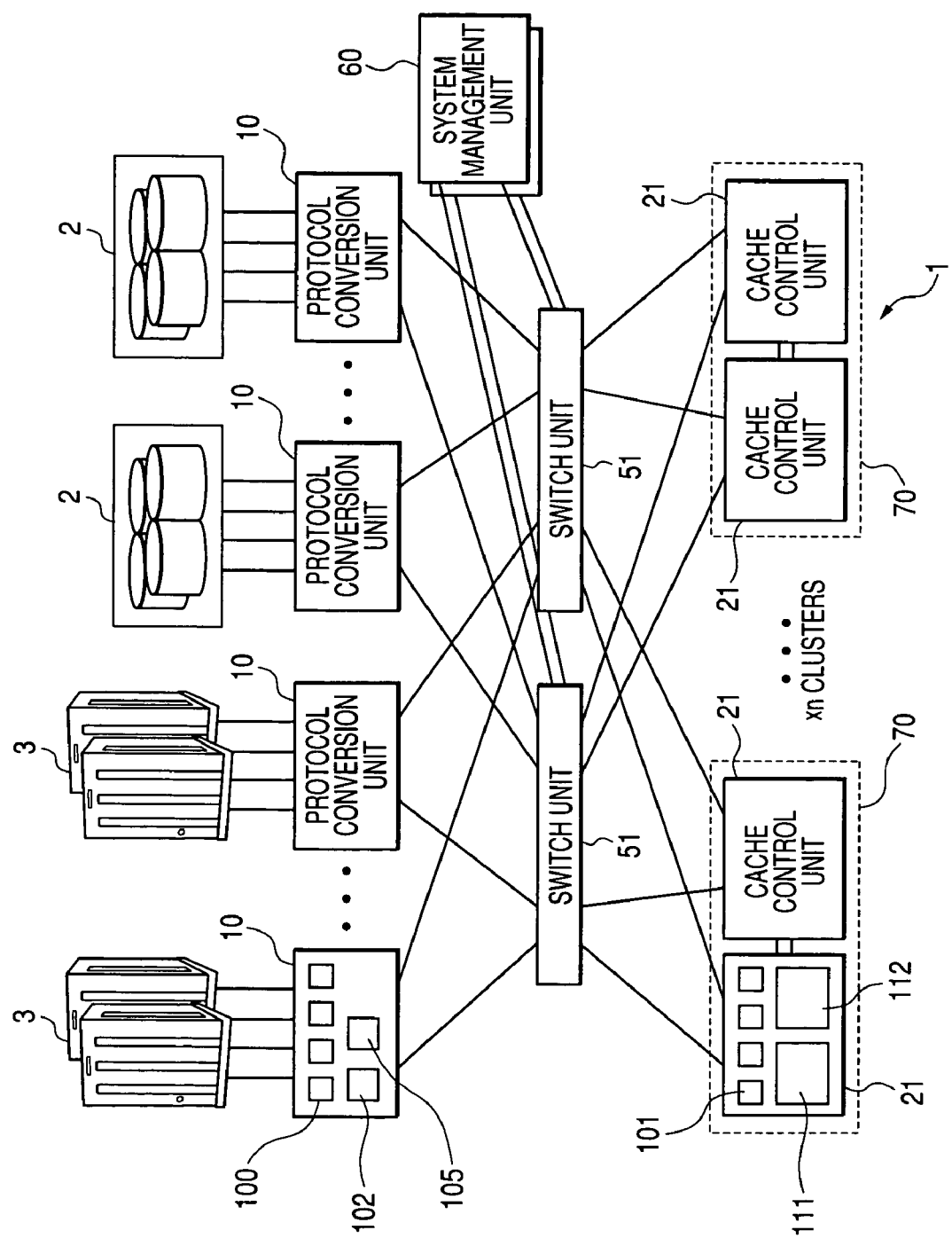
FIG. 30 is a diagram showing an example of the configuration of a storage system.

As shown in FIG. 30, a configuration is also conceivable where two cache control units 21 in a control cluster 70 are connected by two paths. The detailed configuration of the cache control unit 21 in this case is shown in FIG. 31.

Figure 31:
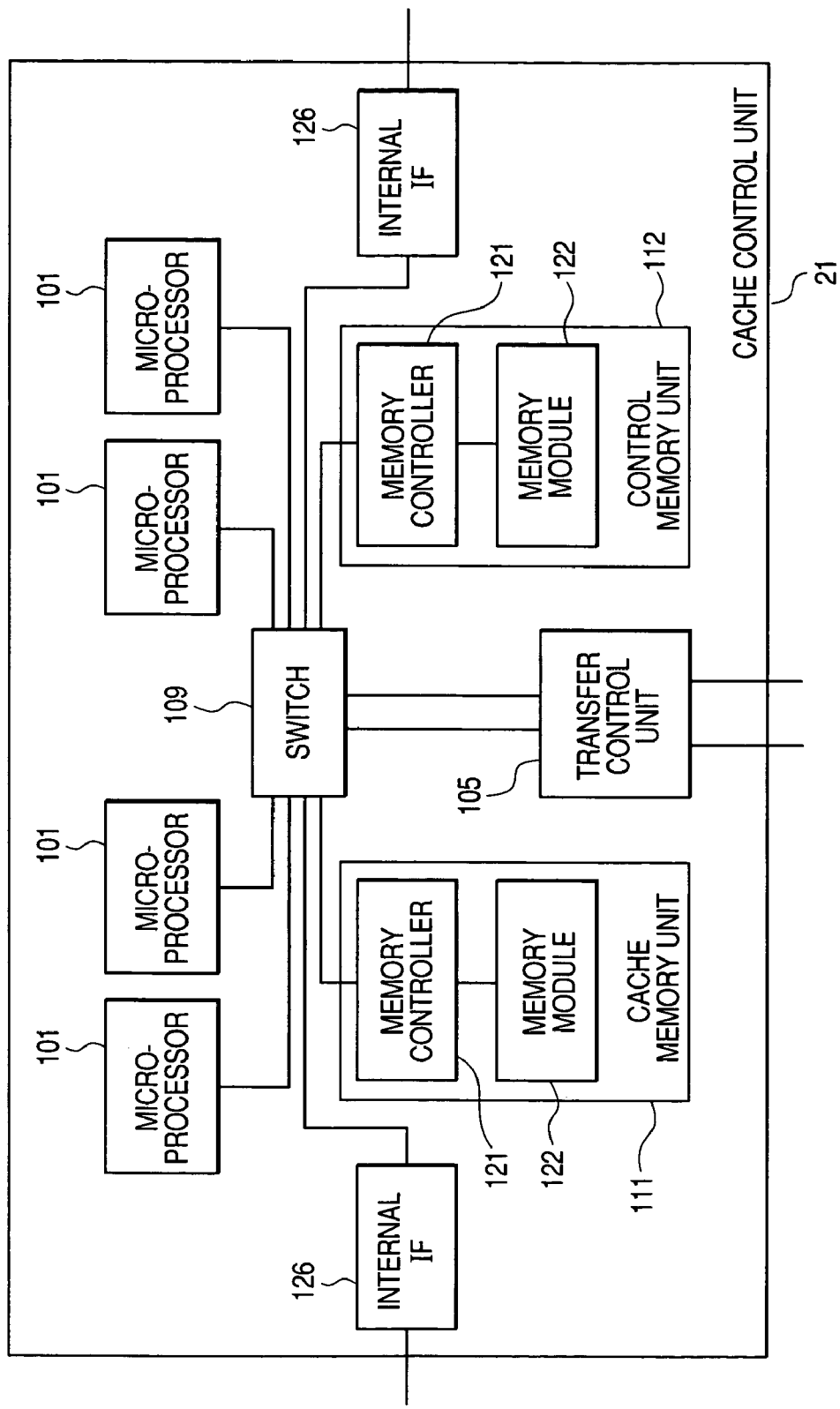
FIG. 31 is a diagram showing an example of the configuration of a cache control unit.

The cache control unit shown in FIG. 31 has the same configuration as that of the cache control unit 21 shown in FIG. 9 except for internal IF 126 connected to the switch 109. Because communication of data and control information is conducted using the connection paths connecting the two cache control units 21 configuring the control cluster, two internal IF 126 are connected to the switch 109. By interconnecting the internal IF 126 of the two cache control units 21 with connection paths, communication of data and control information is conducted through the connection paths. For example, doubling of information stored in the cache memory units 111 or the control memory units 112 of the two cache control units 21 is conducted via the connection paths. Thus, in a case where an error arises in one of the two cache control units 21 configuring the control cluster 70, reliability is improved because it becomes possible to continue the operation of the storage system with the other cache control unit.

Next, an example of the management configuration of the entire storage system 1 will be described on the basis of FIG. 11.

Here, the example of the management configuration of the storage system 1 of the configuration shown in FIG. 4 will be described.

In the system management unit 60, management is conducted by dividing the management of the entire storage system 1 into three layers—i.e., network, logical path and storage—so that management is simplified. Specifically, the system management unit 60 includes, as software programs, a network management part 503, a logical path management part 502 and a storage management part 501. It should be noted that each part shown in FIG. 11 is actually a software program executed by the microprocessor 101 of the system management unit 60. These programs are stored in the memory of the system management unit 60 via a network or portable storage medium.

Figure 11:
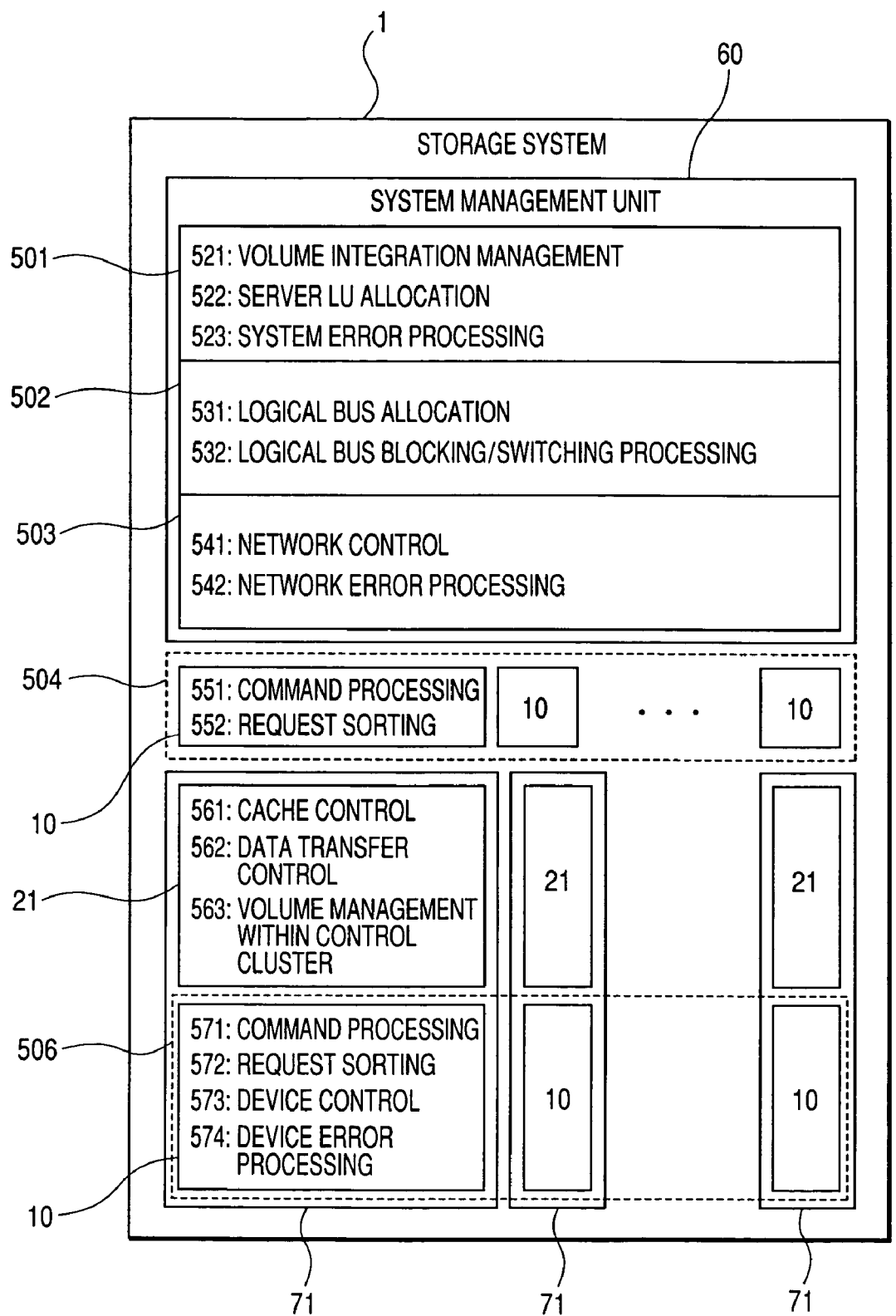
FIG. 11 is a diagram showing an example management configuration of a storage system.

Moreover, in the following description, this processing is actually executed by the microprocessor of the system management unit 60 in a case where each part shown in FIG. 11 is the subject. Moreover, the processing included in each part is also a program. It should be noted that each part may also be executed by dedicated hardware.

Here, by network is meant the interconnection network 31. The network management part 503 conducts at least network control 541 and network error processing 542. For example, in the case of the interconnection network configured by the switch units 51 shown in FIG. 6, the network management part 503 conducts setting of the physical links of the protocol transformation units 10, the switch units 51, the cache control units 21 and the system management unit 60, resetting of the links, and detection/processing of physical errors.

Next, the logical path management part 502 conducts at least logical path allocation 531 and logical path blocking/switching processing 532. Here, by logical path is meant the logical paths respectively set between the protocol transformation units 10, the cache control units 21 and the system management unit 60. For example, in the case of the configuration shown in FIG. 6, the path leading from one protocol transformation unit 10 to one cache control unit 21 via one switch unit 51 serves as one logical path. Thus, two logical paths are set between one protocol transformation unit 10 and one cache control unit 21. Similarly, two logical paths are set between the protocol transformation units 10 and the system management units 60, between the system management units 60 and the cache control units 21, between the protocol transformation units 10, between the cache control units 21, and between the system management units 60. In the logical path management part 502, setting of the logical paths at the time of system startup, blocking in a case where an error has arisen in one of the two logical paths between the units, and processing to switch to the other logical path are conducted.

Next, the storage management part 501 conducts at least volume integration management 521, server LU (logical unit) allocation 522 and system error processing 523. In the volume management 521, the logical volumes respectively managed in each control cluster 71 are integrated and managed. In the server LU allocation 522, an LU is cut out from the integrated logical volumes and allocated to each server 3. Due to the volume management 521 and the server LU allocation 522, it becomes possible to show, with respect to the servers 3, the assembly of plural control clusters 71 conducting respectively independent control as a single storage system 1.

Figure 26:
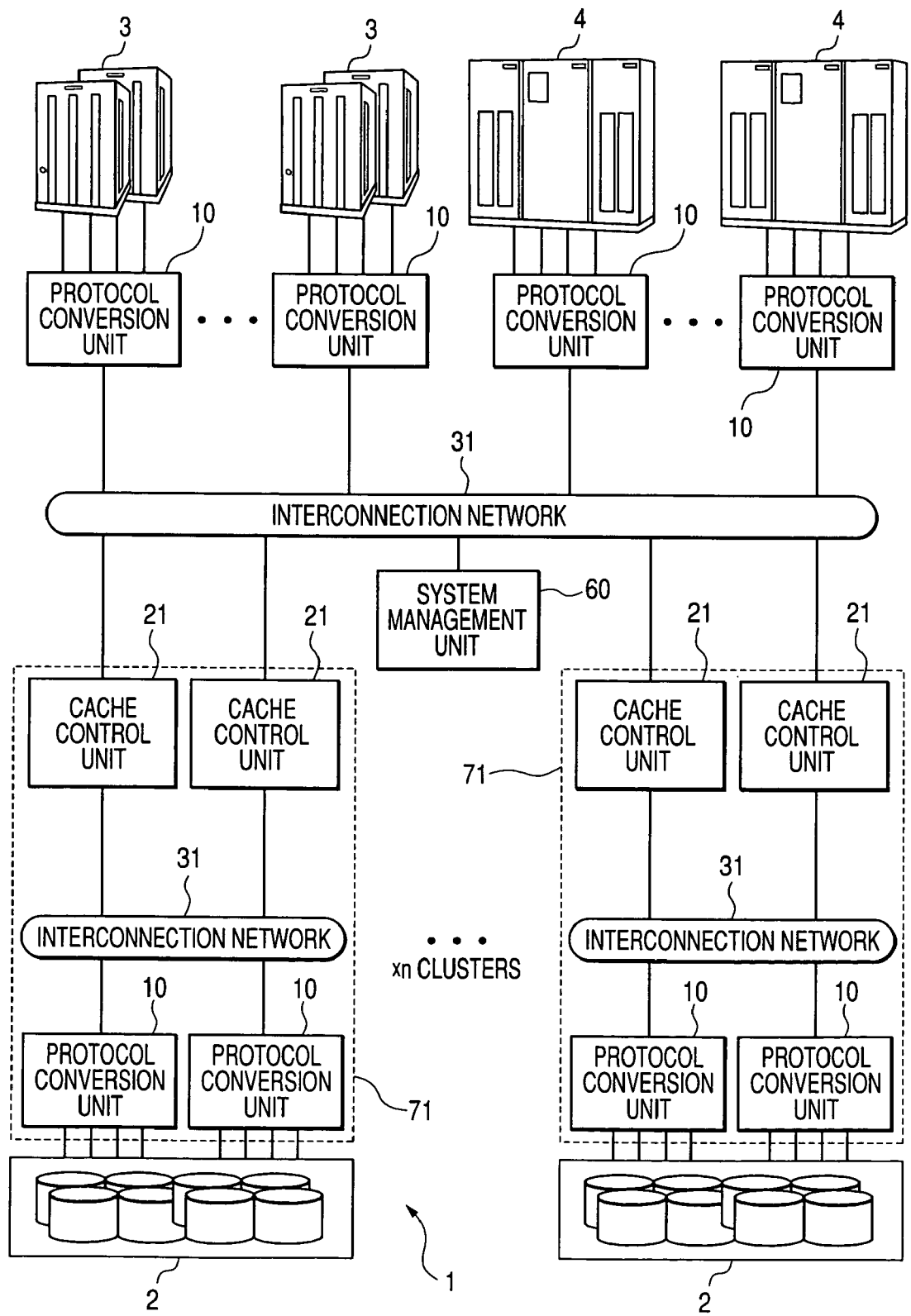
FIG. 26 is a diagram showing an example of the configuration where external devices are connected to protocol transformation units.

In the present embodiment, as shown in FIG. 26, it is also possible to connect other storage systems 4 to the protocol transformation units 10 connecting the servers 3. In this case, the LU that the other storage systems provide are also managed in the volume integration management 521, and these LU are allocated to the servers 3 in the server LU allocation 522, whereby it becomes possible to access the volumes of the other storage systems 4 from the servers 3 via the storage system 1.

Also, in the storage management part 501, a table representing which servers are connected to which protocol transformation units 10 is managed, whereby communication and data transfer between the plural servers 3 connected to the storage system 1 become possible.

When data transfer is conducted between the storage systems 4 and the servers 3 connected to the protocol transformation units 10, data transfer is conducted between the protocol transformation units 10 via the interconnection network 31. In this case, the data may also be cached in the memory of the system management unit 60. The data may also be cached in the cache memory units 111 within the cache control units 21. Thus, the performance of data transfer between the servers 3 and the storage systems 4 is improved.

Figure 27:
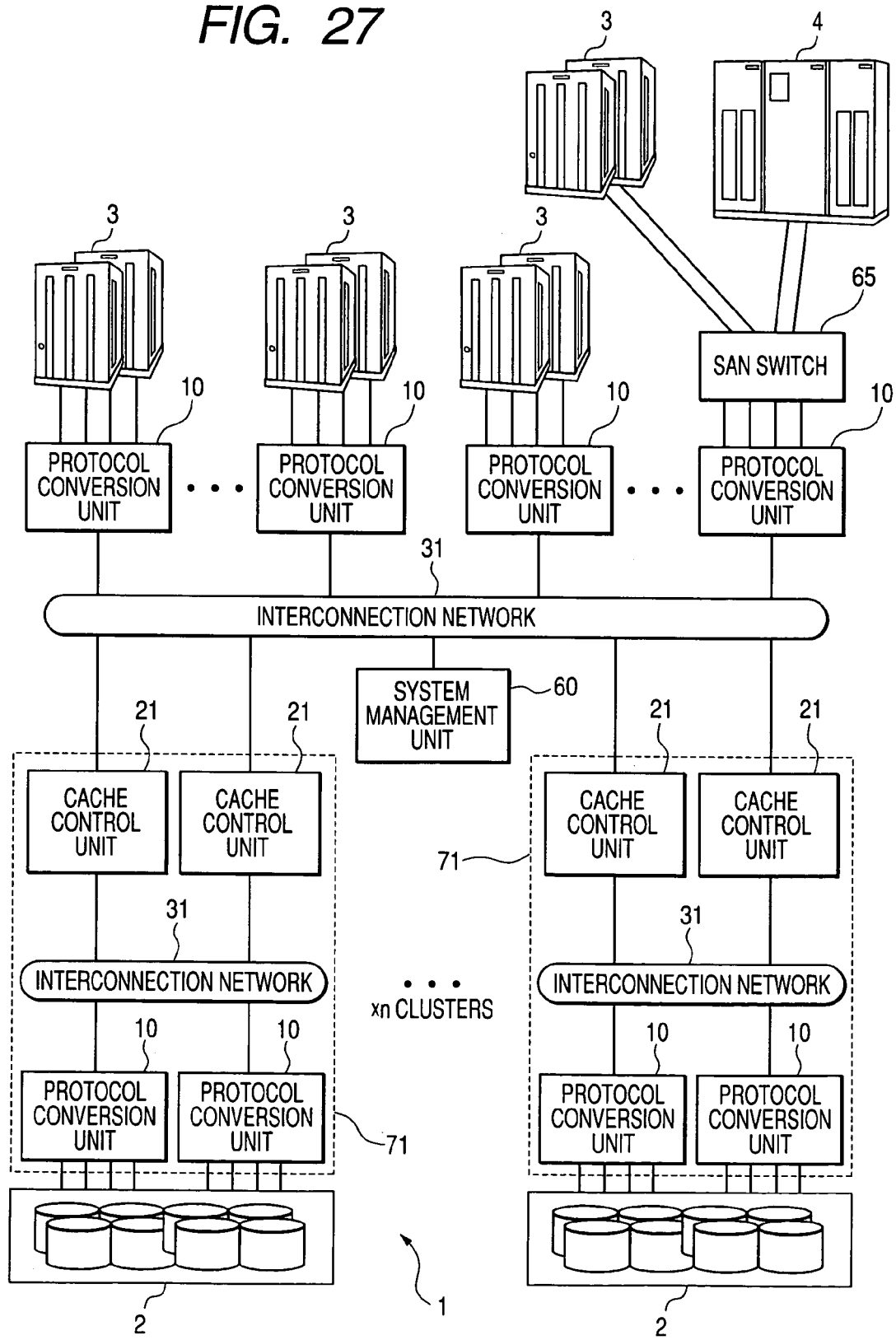
FIG. 27 is a diagram showing an example of a configuration where external devices are connected to protocol transformation units.

Also, in the present embodiment, as shown in FIG. 27, the storage system 1, server 3, and the other storage system 4 may be connected via a SAN switch 65. Moreover, the external IF 100 within the protocol transformation units 10 are configured to access the servers 3 and the other storage system 4 via the SAN switch 65. By doing so, it becomes possible to access the servers 3 and the other storage system 4 connected to the SAN switch 65 or a network comprising plural SAN switches 65 from the servers 3 connected to the storage system 1.

In the system error processing 523, respective error information is collected from the protocol transformation units 10 and the cache control units 21, logical path error information is collected from the logical path management part 502, and sites to be blocked/replaced in the storage system 1 are determined from this information. Additionally, control information commanding implementation of blocking processing is sent to the corresponding sites (the protocol transformation units 10, the cache control units 21 or the switch units 51), and blocking processing is conducted with respect to the corresponding sites that have received the control information. After completion of the blocking processing, a message prompting the user to replace the error site is displayed on the management console. Moreover, when the user inputs a message indicating completion of the replacement of the error sites, control information commanding blockage deletion is sent to the corresponding sites, and blocking deletion processing is conducted with respect to the sites that have received the control information. After the completion of the blockage deletion processing, the system returns to normal operation.

As described above, the entire storage system 1 is managed by dividing management into three layers within the system management units 60.

Here, there is no problem even if control of the system is conducted using the network management part 503 and the logical path management part 502 as a single management part.

Figure 2:
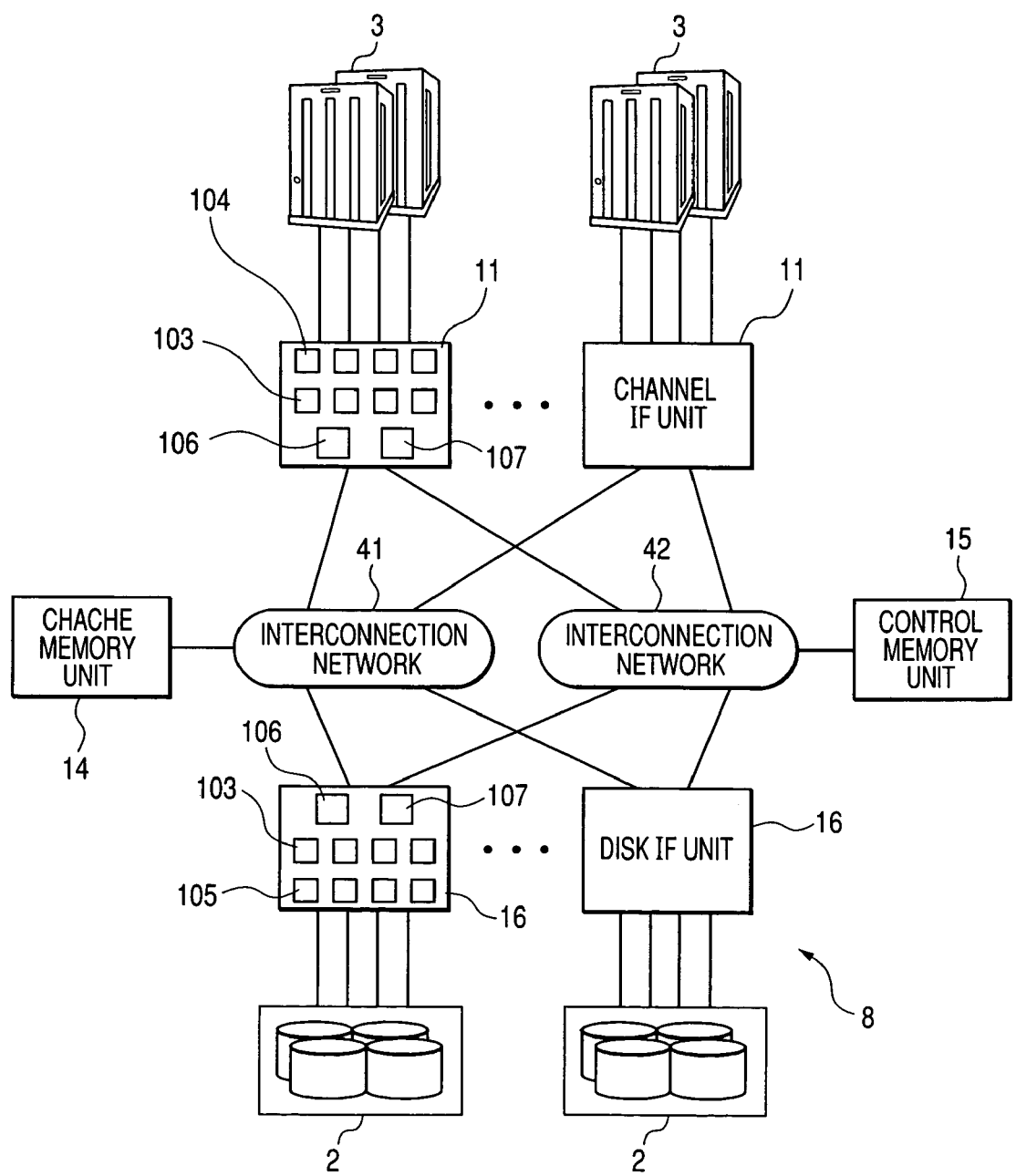
FIG. 2 is a diagram showing an example of the configuration of a conventional storage system.

In the present invention, the transmission and reception of data/commands with the servers 3, command analysis and sorting processing of requests from the servers 3 that had been conducted in the channel IF units 11, and the transmission and reception of data/commands with the hard disk groups 2, command analysis and sorting of requests to the hard disk groups 2 that had been conducted in the disk IF units 16 in the prior art shown in FIG. 2 are separated as processing of the protocol transformation units 10, and other processing of the channel IF units 11 and the disk IF units 16 is consolidated as processing in the cache control units 21.

Thus, in the cache control units 21, at least cache control 561, data transfer control 562 and volume management 563 within control clusters are conducted. In the cache control 161, control of the reading/writing of data to the cache memory units 111, management of the directories within the cache memory units 111 stored in the control memory units 112 and hit/miss processing that checks whether or not requested data is present in the cache memory units 111 are conducted. In the data transfer control 562, control of data transfer between the protocol transformation units 10 and the cache memory units 111 is conducted. In the volume control 563 within control clusters, logical volumes within the control clusters are configured from the physical volumes of the hard disk groups 2, and a table representing this is managed.

Also, the protocol transformation units 10 are divided into a server-connected group 504 that is the group of protocol transformation units 10 connected to the servers 3 and a device-connected group 506 that is the group of protocol transformation units 10 connected to the hard disk groups 2.

The protocol transformation units 10 included in the server-connected group 504 at least conduct command processing 551 and request sorting 552. In the command processing 551, the transmission and reception of commands with the servers 3 are conducted, and analysis of commands from the servers 3 and issuance of commands to the servers 3 are conducted. In the request sorting 552, data and data read/write commands from the servers 3 are transformed to the internal protocol and transferred to the corresponding cache control units 21 or protocol transformation units 10. Also, commands and data from the cache control units 21 or the protocol transformation units 10 to the servers 3 are transformed from the internal protocol to the protocol between the servers 3 and the protocol transformation units 10 and sent to the servers 3.

The protocol transformation units 10 belonging to the device-connected group 506 at least conduct command processing 571, request sorting 572, device control and device error processing.

In the present embodiment, by device is meant the hard disk groups 2, but it suffices as long as it is a device that records block data. For example, there is no problem even if the device is an optical disk.

In the command processing 571, the transmission and reception of commands with the devices are conducted, and issuance of commands to the devices and analysis of replies from the devices are conducted. In the request sorting 572, data and data read/write commands to the devices are transformed from the internal protocol to the protocol between the devices and the protocol transformation units and transferred to the corresponding devices. Also, replies and data from the devices are transferred to the corresponding cache control units 21 or the protocol transformation units 10. In the device control 573, control of reading/writing to the devices is conducted. In the device error processing 574, blocking/replacement processing of the devices is conducted in a case where an error has occurred in the devices.

As described above, by consolidating and conducting, in the cache control units 21, processing that had been divided between and conducted by the channel IF units 11 and the disk IF units 16 in the prior art, it becomes possible to improve the performance of the storage system 1 because communications processing conducted between the channel IF units 11 and the disk IF units 16 via the control memory unit 15 for data transfer is eliminated.

Although the management configuration in the storage system 1 of the configuration shown in FIG. 4 was described above, in the case of the configuration shown in FIG. 1, processing that conducts coherence control of data multiply stored in the cache memory units of the plural control clusters is added to the system management unit 60, whereby the same processing becomes possible.

Next, examples of the relation between the physical volumes and the logical volumes, the relation between the logical volumes and the logical units, and the relation of allocation of the logical units to the servers are shown in FIGS. 12 to 15. Below, the logical volumes are called virtual volumes.

FIG. 12 shows a physical device management table 651. That is, FIG. 12 shows the relation between physical devices (in the present example, the hard disk groups 2) and virtual volumes in which the physical devices are consolidated as volumes. A physical device number (PDEV#) 630 respectively corresponds to one hard disk. One virtual volume 1 is configured from four physical devices, and a clearly specified number is allocated to these inside the control clusters 71 as virtual volume 1 number 631. Also, a RAID class 605 representing the RAID configuration of the virtual volume 1 and a volume capacity 601 representing the capacity of the virtual volume 1 are added to the virtual volume 1. Also, a connection adapter number 610 representing which volume is managed by which protocol transformation unit (also called protocol transformation adapter (PA) below) 10 is added to the virtual volume 1 within the control clusters 71. A virtual volume 2 number 632 is one where the system management unit 60 allocates a clearly specified number in the entire storage system 1 in order to integrally manage all virtual volumes 1 of the plural control clusters 71.

Portions other than the virtual volume 2 number of the physical device management table 651 are created in the cache control units 21 for each control cluster 71 at the time of initialization, these are registered in the system management unit 60, and the system management unit 60 creates a table (the physical device management table 651) where the virtual volume 2 number 632 is allocated on the basis of the tables from all of the control clusters 71. Additionally, a copy of the portions relating to each control cluster 71 in this table is transferred to the cache control units 21 of the corresponding control clusters 71, and each cache control unit 21 stores this in the control memory units 112.

In a case where there has been a change in the configuration of the hard disk groups 2, the cache control units 21 managing the hard disk groups 2 change the portion other than the virtual volume 2 number of the physical device management table 651 and registers this in the system management unit 60. The system management unit 60 changes the physical device management table 651 based on the registered information and transfers a copy of the portion of the table relating to each of the control cluster 71 to the cache control unit 21 in the corresponding control cluster 71. The respective cache control units 21 stores the copy in the control memory unit 112.

Here, there is no problem if all of the information necessary to create the physical device management tables 651 is transferred from the cache control units 21 to the system management unit 60 and all of the physical device management tables 651 are created in the system management unit 60 on the basis of this.

FIG. 13 shows a virtual volume management table 652. Because the virtual volume 1 (virtual volume 2) is configured from plural hard disks, the capacity thereof becomes greater than several hundred GB. Thus, in order to improve the ease with which the user can use this, the virtual volume 1 (virtual volume 2) is divided into plural virtual volumes 3 with a small capacity. The virtual volume management table 652 is a table for showing the relation between numbers 633 of the virtual volumes 3 and addresses 641 within the virtual volume 1. Also included in the virtual volume management table 652 are management cache control unit numbers 621 that represent which cache control units 21 manage the virtual volume 1.

Here, in a case where the capacity of the hard disks is small (several GB), or in a case where the capacity of the logical unit necessary for the user has become larger from several tens to several hundreds of GB, it is not necessary to create the virtual volumes 3.

The system management unit 60 creates the virtual volume management table 652 on the basis of information of the virtual logical volumes 1 transferred from the cache control units 21.

FIG. 14 shows a logical unit management table 653. This table shows the relation between the virtual volumes 3 and the logical units that are actually provided to the user. The logical units are configured from one or more virtual volumes 3. In the logical unit management table 653, the relation between logical unit numbers 661 and virtual volume 3 numbers 633 configuring the logical units is shown. As for the logical unit numbers 661, numbers determined at positions in the entire storage system 1 are allocated. Also, RAID classes 605 of the virtual logical volumes 1 to which the logical units belong are also shown in order to show the reliability of the logical units. Also, management cache control unit numbers 621 that represent which cache control units 21 manage the virtual volumes 3 configuring the logical units are shown. There is no problem even if the logical units are configured from plural virtual volumes 3 where the management cache control units are different. By doing so, the load on the cache control units 21 is dispersed and it becomes possible to improve the performance of the storage system 1 because access with respect to one logical unit is dispersed to plural cache control units 21.

FIG. 15 shows a logical unit allocation management table 654. This table shows the relation between connection server numbers 670 and the logical units allocated to the servers. In a case where plural logical units are allocated with respect to the servers, it is necessary to allocate, from 0, the numbers of the respective logical units allocated to the servers. Thus, virtual logical unit numbers 662 that begin with 0 are allocated and the logical units are provided with respect to the servers. The logical unit allocation management table 654 also shows the relation between the virtual logical unit numbers 662 and logical unit numbers 661. Also, connection adapter numbers 611 and connection channel numbers 615 that represent which connection channels of which protocol transformation units 10 the servers are connected to are shown. Moreover, management cache control unit numbers 621 representing which cache control units 21 manage the virtual volumes configuring the logical units are also shown. The management cache control unit numbers 621 are necessary in order to know, without having to ask the system management unit 60, which cache control units 21 the protocol transformation units 10 to which the servers are connected should access with respect to access requests from the servers. By doing so, it becomes possible to reduce response time with respect to access requests from the host.

Incidentally, the system management unit 60 creates/manages the logical unit allocation management table 654 on the basis of information from the protocol transformation units 10 to which the servers 3 are connected and user setting information from the management console. Additionally, the system management unit 60 transfers, to the corresponding protocol transformation units 10, a copy of the portions relating to each protocol transformation unit 10 in this table, and each protocol transformation unit 10 stores this in the memory connected to the microprocessor 102.

In a case where there has been a change in the connection configuration of the servers or allocation of the logical units, the system management unit 60 changes the logical unit allocation management table 654 and transfers a copy of the portion relating to each protocol transformation unit 10 within the table to the corresponding protocol transformation units 10, and the protocol transformation units 10 store this in the memory (not shown) connected to the microprocessors 102.

All or some of the tables shown in FIGS. 12 to 15 are displayed on a monitor of the management console so that the user can set all or some of the relations between the logical units, the virtual volumes and the physical devices from the management console.

In the present embodiment, plural types of volumes were configured from physical devices to logical volumes and logical units provided to the user, but this was one example and it is not necessary for the volumes to have the same configuration as this. What is necessary are the functions of independently configuring/managing the volumes within the control clusters 71, integrally managing in the system management unit 60 the volumes that all of the control clusters 71 in the storage system 1 provide, and cutting out volumes from those and supplying them to the user, whereby the present invention can be implemented.

Figure 16:
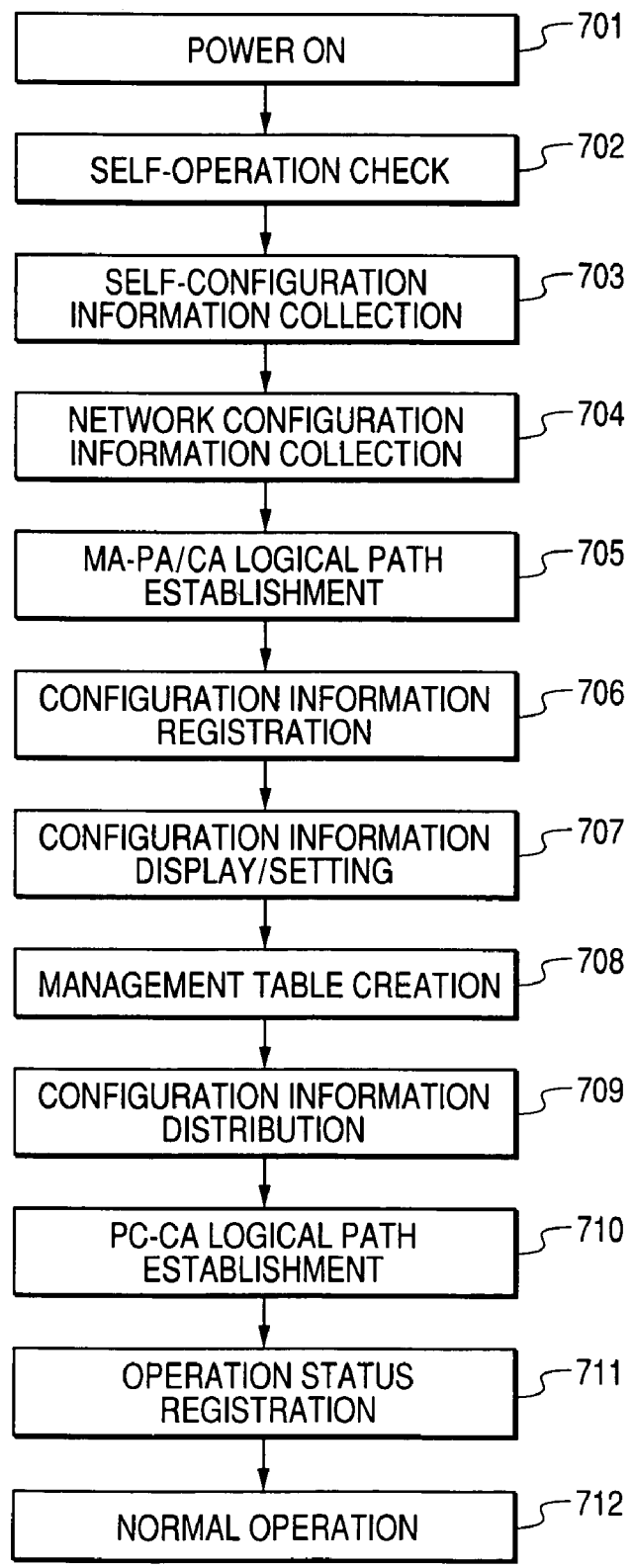
FIG. 16 is a diagram showing an example of an initialization flow at the time of system startup.

Next, an example of an operation flow at the time of system initialization of the storage system 1 is shown in FIG. 16. First, when the power is switched ON (701), the protocol transformation units 10, the cache control units 221 and the system management unit 60 conduct a self-operation check (702). In the self-operation check (702), each unit conducts an internal diagnostic to check whether the unit is normally operating or if there is an error. If there is an error, the unit notifies the system management unit 60 of this in later configuration information registration (706). In the case of an error for which notification cannot be given, a display unit indicating the error in the unit is switched ON. When each unit determines in the self-operation check 702 that the unit is normally operating, each unit collects its own configuration information (ID number identifying the unit, processor number identifying the processor in the unit, processor type/specification, memory capacity, etc.) (703). At this time, the protocol transformation units 10 to which the hard disk groups 2 are connected check the configuration of the hard disk groups 2 connected to them and check to see if there is an error in the hard disks. In a case where there is an error in the hard disks, the protocol transformation units 10 notify the system management unit 60 of this in the later configuration information registration 706.

Next, the network management part 503 in the system management unit 60 collects the information of the physical links of the interconnection network 31 and checks the configuration of the interconnection network 31 (704). After the self-information collection 703, the protocol transformation units 10 and the cache control units (also called "CA" below) 21 wait for an amount of time necessary for the system management unit (also called "MA" below) 60 to conduct network configuration information collection (or a preset amount of time), and then establish logical paths with the system management unit 60 (705). Thereafter, the protocol transformation units 10 and the cache control units 21 register, in the system management unit 60, their own configuration information that they have collected (706). At this time, as described above, the system management unit 60 is also notified of error information.

Next, the system management unit 60 displays some or all of the management tables of the configuration information shown in FIGS. 12 to 15 (as shown in the drawings, portions for which user setting is necessary are empty tables rather than tables where the relations between the respective numbers are all set) on the monitor of the management console connected to the system management terminal 60, and has the user conduct setting of some or all of the relations between the physical devices, the virtual volumes and the logical units on the management console (707). The tables displayed here are not management tables in which all the relations are set as shown in the drawings, but portions for which setting of the relations by the user is necessary are emptily displayed so that these portions can be set by user input. Next, the system management unit 60 completes the management tables shown in FIGS. 12 to 15 on the basis of settings from the user and stores these in the memory in the system management unit 60 (708). These management tables are also stored in one or both of the nonvolatile memory in the system management unit 60 and a hard disk among the hard disk groups 2 for when an error arises.

Next, a copy of the portions in the management tables respectively relating to each protocol transformation unit 10 and each cache control unit 21 is distributed to each protocol transformation unit 10 and each cache control unit 21, and each unit to which the copy has been distributed stores the copy in its own memory (709).

Next, the protocol transformation units 10 reference the management tables relating to them that have been distributed from the system management unit 60, check the cache control units 21 for which it is necessary for them to access, and establish logical paths with the corresponding cache control units 21 (710). Finally, the protocol transformation units 10 and the cache control units 21 determine whether all initialization operations have ended normally and notify the system management unit 60 of the result. The system management unit 60 confirms the notification of normal completion of initialization of all of the protocol transformation units 10 and the cache control units 21 and confirms normal completion of its own initialization (711). After confirmation of normal completion of all initialization, normal read/write operations begin (712).

Figure 17:
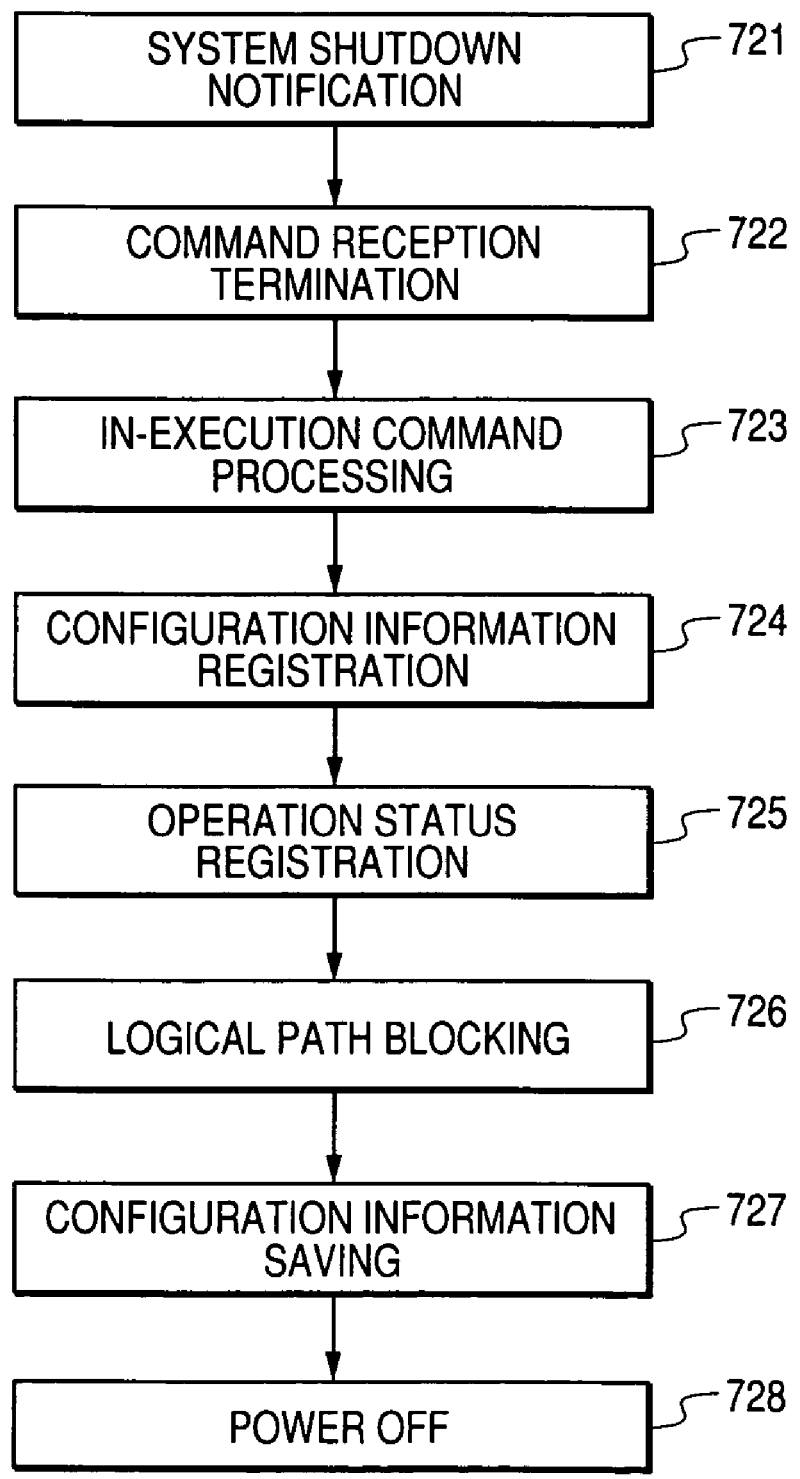
FIG. 17 is a diagram showing an example of a flow at the time of system shutdown.

Next, an example of an operation flow at the time of system shutdown of the storage system 1 is shown in FIG. 17. First, when a notification of system shutdown is issued from the management console (721), the system management unit 60 issues control information instructing command reception termination to the protocol transformation units 10 and the cache control units 21. When the units receive this, each unit terminates reception of commands (722).

After the termination of command reception, the protocol transformation units 10 and the cache control units 21 process all commands that have already been received (723). Next, the protocol transformation units 10 and the cache control units 21 collect their own configuration information in the same manner as at the time of initialization and register the configuration information in the system management unit 60 (724). Next, the protocol transformation units 10 and the cache control units 21 register, in the system management unit 60, the fact that operation shutdown is possible (725).

Thereafter, the protocol transformation units 10 block the logical paths with the cache control units 21. Also, the protocol transformation units 10 and the cache control units 21 block the logical paths with the system management unit 60 (726). Finally, the system management unit 60 save, in the nonvolatile memory, the configuration information registered from the protocol transformation units 10 and the cache control units 21 and the configuration information within the system management unit 60 (727). Thereafter, "System Shutdown Process Completed, Able to Turn Power Off" is displayed on the monitor of the management console, and the power is switched OFF.

Next, an example of a case where data recorded in the storage system 1 is read from the servers 3 will be described with reference to FIG. 18.

First, the servers 3 issue a data read command with respect to the storage system 1.

When the external IF 100 in the protocol transformation units 10 receive the command, the microprocessors 102 that had been waiting on a command (741) read the command from the external IF 100 (742) and conduct command analysis (743). Logical units (also called "LU" below), in which the data requested by the servers 3 is recorded, are allocated from the command analysis. The microprocessors 102 reference the logical unit allocation management table 654 that was distributed from the system management unit 60 at the time of system initialization/alteration and which relates to the microprocessors' protocol transformation units 10, and allocate cache control units 21 managing the virtual volume configuring the LU in which the requested data is recorded (744).

Then, the microprocessors 102 issue a data read request from their own transfer control units 105 via the interconnection network to the transfer control units 105 of the corresponding cache control units 21 (745). The microprocessors 101 in the cache control units 21 receiving the read request access the control memory units 112, reference the logical unit management table 653, the virtual volume management table 652 and the physical device management table 651, and allocate the virtual volume 1 number 631 and address 641 in the virtual volume 1 (746). Next, the microprocessors 101 access the control memory units 112 and determine from the virtual volume 1 number 631 and the address 641 in the virtual volume 1 whether or not the requested data is in their cache memory units 111 (747).

In a case where the requested data is in their own cache memory units 111 (cache hit), the microprocessors 101 instruct their own transfer control units 105 to transfer the requested data from the cache memory units 111 to the protocol transformation units 10 issuing the request (755). The own transfer control units 105 transfer the requested data via the interconnection network 31 to the transfer control units 105 of the protocol transformation units 10 issuing the request (756). The transfer control units 105 of the protocol transformation units 10 receiving the requested data transmit the data to the servers 3 through the external IF 100 (757).

In a case where the requested data is not in their own cache memory units 111 (cache miss), the microprocessors 101 secure in the cache memory units 111 a region in which to store the requested data (749). After the cache region securement, the microprocessors 101 access the control memory units 112, reference the physical device management table 651 and allocate the connection adapter number 610 (numbers of the protocol transformation units 10 to which the physical device (here, a hard disk) is connected) managing the physical device (also called "PDEV" below) configuring the requested virtual volume 1 (750). Next, the microprocessors 101 read the requested data from their own transfer control units 105 to the transfer control units 105 of the corresponding protocol transformation units 10 and send control information instructing transfer to the cache control units 21 (751). The microprocessors 102 of the corresponding protocol transformation units 10 receive this control information from their own transfer control units 105, reference the copy of the physical device management table 651 that was sent from the system management unit 60 at the time of initialization/alteration and which relates to themselves, determines the physical device (PDEV: hard disk) from which the data is to be read, and reads the data from the corresponding hard disk (752). This data is transferred from the own transfer control units 105 via the interconnection network 31 to the transfer control units 105 of the cache control units 21 issuing the request (753). When their own transfer control units 105 receive the requested data, the microprocessors 101 of the cache control units 21 issuing the request write the data to the cache memory units 111 and update the directories of the cache memories stored in the control memory units 112 (754). The operation flow thereafter is the same as from operation flow 755 in the case of a cache hit. As described above, data is read from the hard disk with respect to a read request from the servers 3 and sent to the servers 3.

Next, an example of a case where data is written from the servers 3 to the storage system 1 will be described with reference to FIG. 19.

First, the server 3 issues data write command with respect to the storage system 1.

When the external IF 100 in the protocol transformation units 10 receive a command, the microprocessors 102 that had been waiting on a command (761) read the command from the external IF 100 (762) and conduct command analysis (763). The microprocessors 102 allocate logical units (LU), in which the data requested by the servers 3 is recorded, from the command analysis. The microprocessors 102 reference the logical unit allocation management table 654 that was distributed from the system management unit 60 at the time of initialization/alteration and which relates to the microprocessors' protocol transformation units 10, and allocate cache control units 21 managing the virtual volume configuring the LU in which the requested data is recorded (764).

Here, when the cache memory units 21 managing the virtual volume are doubled, the reliability of the storage system 1 can be improved. That is, the cache control units 21 managing the volume and backup-use cache control units (also called "BCA" below) 21 are determined for each virtual volume, and data is written to both. By doing so, it becomes possible to continue the operation in the backup cache control units 21 in a case where an error has occurred in the master cache control units 21. In this case, in the processing of 764, the backup-use management cache control units 21 are also described in the logical unit allocation management table 654 and the numbers thereof are also allocated. Below, a case will be described where the backup-use management cache control units 21 are determined.

The microprocessors 102 issue a data write request from their own transfer control units 105 via the interconnection network 31 to the transfer control units 105 of the corresponding cache control units 21 and the backup-use cache control units 21 (765). The microprocessors 101 in the cache control units 21 and the backup-use cache control units 21 receiving the write request access the control memory units 112, reference the logical unit management table 653, the virtual volume management table 652 and the physical device management table 651, and allocate the virtual volume 1 number 631 and address 641 in the virtual volume 1 (766). Next, the microprocessors 101 access the control memory units 112 and determine from the virtual volume 1 number 631 and the address 641 in the virtual volume 1 whether or not the requested data write is in their cache memory units 111 (767).

In a case where the requested data is in their own cache memory units 111 (cache hit), the microprocessors 101 notify the protocol transformation units 21 issuing the notice of the completion of writing preparation (also called "writing preparation completion" below) through the transfer control units 105 (770). In a case where the requested data is not in their own cache memory units 111 (cache miss), the microprocessors 101 secure in the cache memory units 111 a region in which to store the requested data (769), and thereafter give notification of writing preparation completion (770).

The microprocessors 102 of the protocol transformation units 10 receive the notification of writing preparation completion and notify the servers 3 of writing preparation completion through the external IF 100. Thereafter, the protocol transformation units 10 receive, through the external IF 100, the data sent from the servers 3 that had received the notification of writing preparation completion (772). The microprocessors 102 instruct their own transfer control units to send the data to the transfer control unit 105 of the corresponding cache control units 21 and the backup-use cache control units 21 (773). The microprocessors 101 of the cache control units 21 and the backup-use cache control units 21 receiving the data write the data in their own cache memory units 111 and update the directories of the cache memories in the control memory units 112 (774). When the writing of the data to the cache memory units 111 ends, the microprocessors 101 of the cache control units 21 and the backup-use cache control units 21 send a writing completion notification through the transfer control units 105 to the protocol transformation units 10 issuing the request (775). The microprocessors 101 of the protocol transformation units 10 receiving the writing completion notification send the writing completion notification to the servers 3 through the external IF 100. As for the data written to the cache memory units 111, the microprocessors 101 of the master cache control units 21 determine the empty capacity of the cache memory units 111 and write, asynchronously from the write request from the servers 3 and via the protocol transformation units 10 to which the hard disk is connected, the data to the hard disk including the volume in which the data is recorded. Thus, the writing operation is conducted with respect to the write request from the servers 3.

According to the present embodiment, the access load on the cache memory units and the control memory units is reduced because control of the cache memories is conducted independently for each control cluster. Also, inter-processor communications processing that had been necessary in the prior art shown in FIG. 2 is reduced because control of the cache memories and data transfer between the servers and the hard disks are consolidated and conducted by the microprocessors in the cache control units. Thus, it becomes possible to improve the performance of the entire storage system 1.

Also, it becomes possible to operate the storage system per single control cluster because control of the cache memories is conducted independently for each control cluster. Thus, the cost of the system can be optimized per control cluster, it becomes possible to provide a system of a small-scale configuration at a low cost, and it becomes possible to provide a system at a cost that meets the system scale.

Thus, it becomes possible to provide a storage system with a cost/performance meeting the system scale, from a small-scale to a large-scale configuration.

Figure 5:
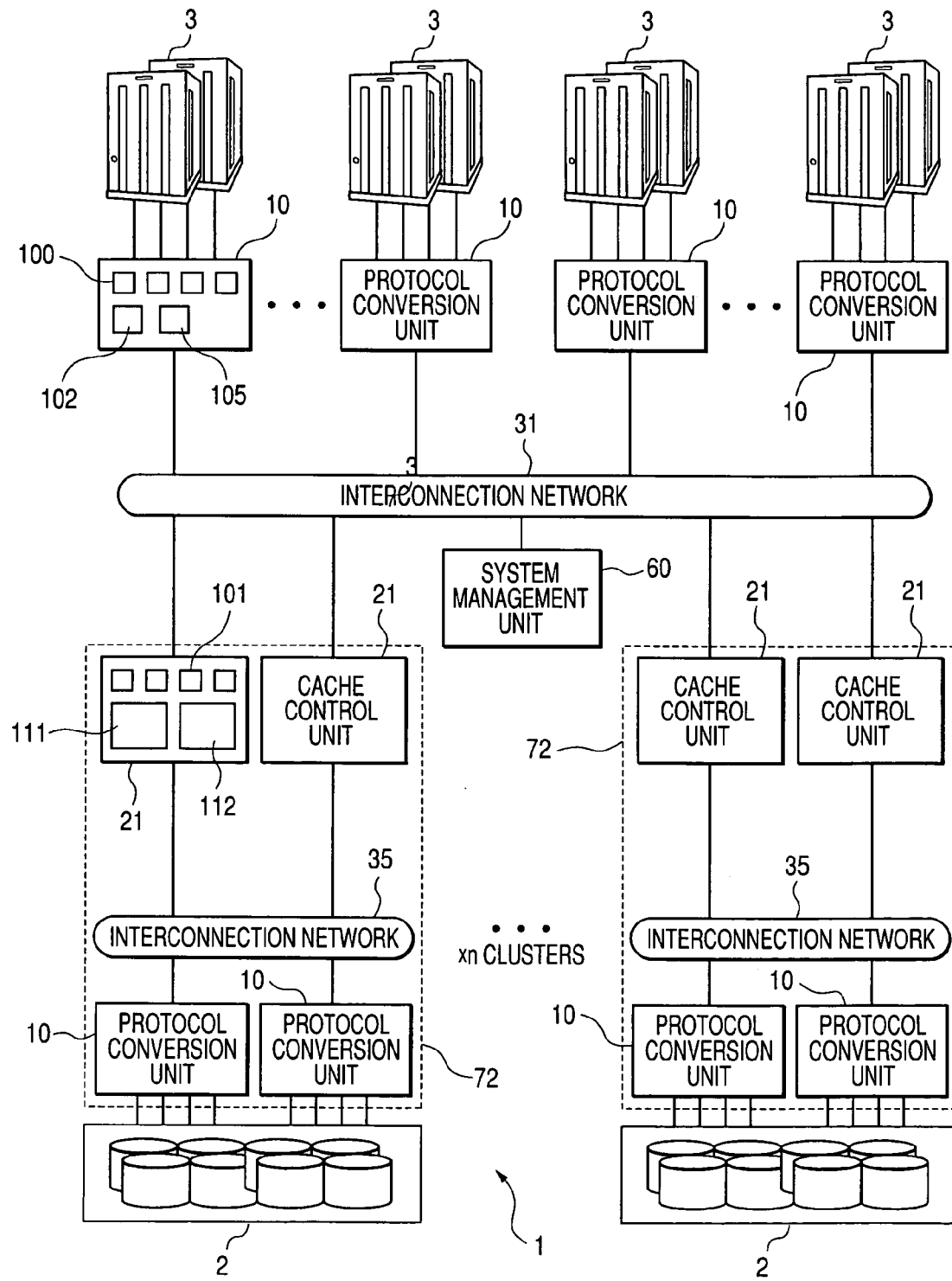
FIG. 5 is a diagram showing an example of the configuration of a storage system.
Figure 7:
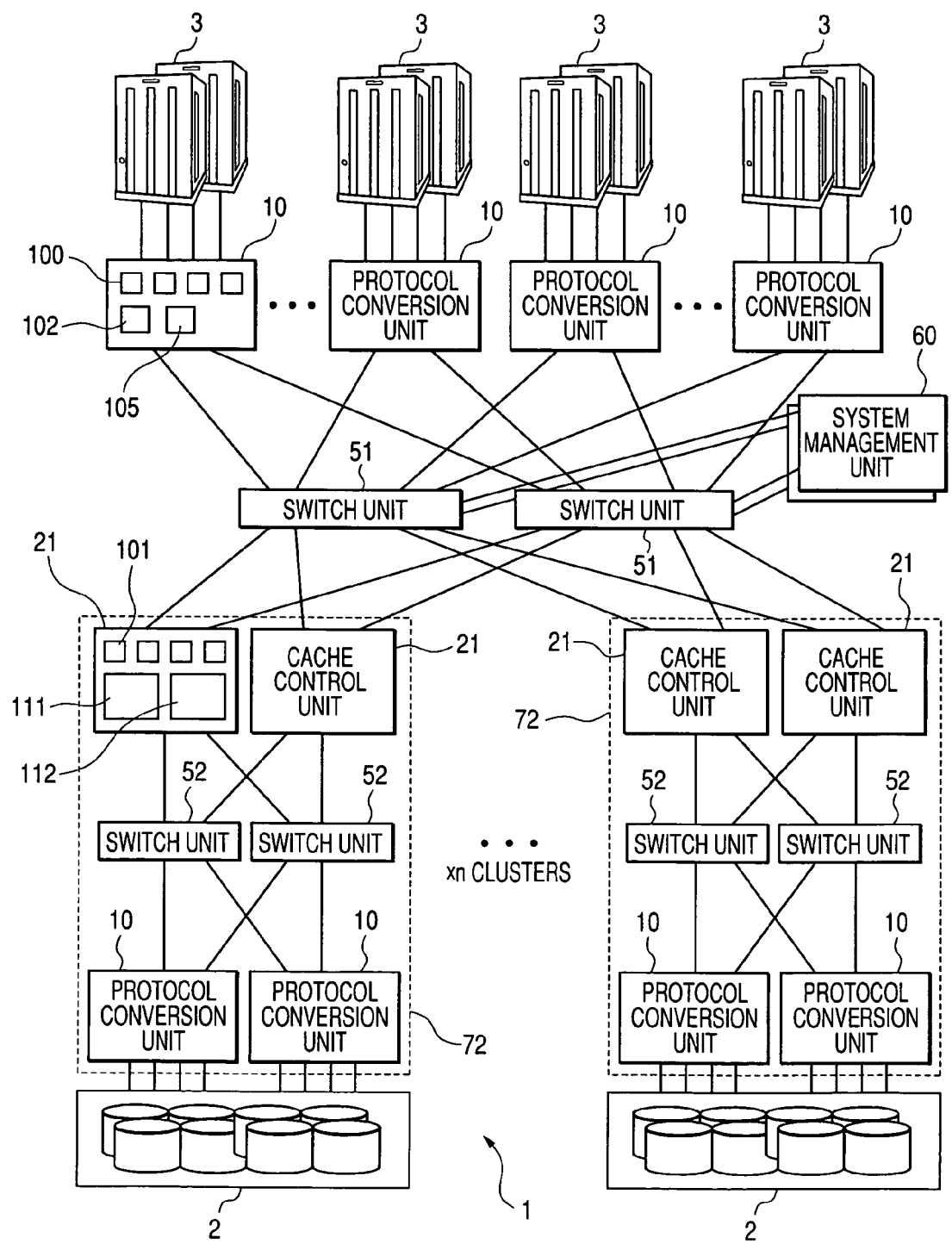
FIG. 7 is a diagram showing an example of the detailed configuration of an interconnection network.

A second embodiment is shown in FIGS. 5 and 7.

As shown in FIG. 5, the configuration of the storage system 1 is the same as the configuration shown of the first embodiment shown in FIG. 4, except that the interconnection network 31 connecting the cache control units 21 and the protocol transformation units 10 to which the servers 3 are connected and interconnection networks 35 connecting the cache control units 21 and the protocol transformation units 10 to which the hard disk groups 2 are connected are physically independent.

The interconnection network 31 and the interconnection networks 35 are physically independent and are not directly connected.

FIG. 7 shows an example of a case where the interconnection network 31 and the interconnection networks 35 are respectively configured by switch units 51 and switch units 52. The switch units 52 have a configuration where the total number of path IF is four with respect to the switch units 51 shown in FIG. 22.

By configuring the system in this manner, there is the potential for costs to rise as a result of preparing two independent interconnection networks, but data transfer between the cache control units 21 and the protocol control units 10 to which the servers 3 are connected and data transfer between the cache control units 21 and the protocol transformation units 10 to which the hard disk groups 2 are connected no longer interfere with one another as in the configuration of the first embodiment. Also, the performance of the storage system 1 is improved because it becomes possible to configure interconnection networks of a specification matching the performance demanded of the respective data transfers.

In the configuration of the present embodiment, effects that are the same as those of the first embodiment are obtained without problem, and it becomes possible to provide a storage system with a cost/performance meeting the system scale, from a small-scale to a large-scale configuration.

Figure 24:
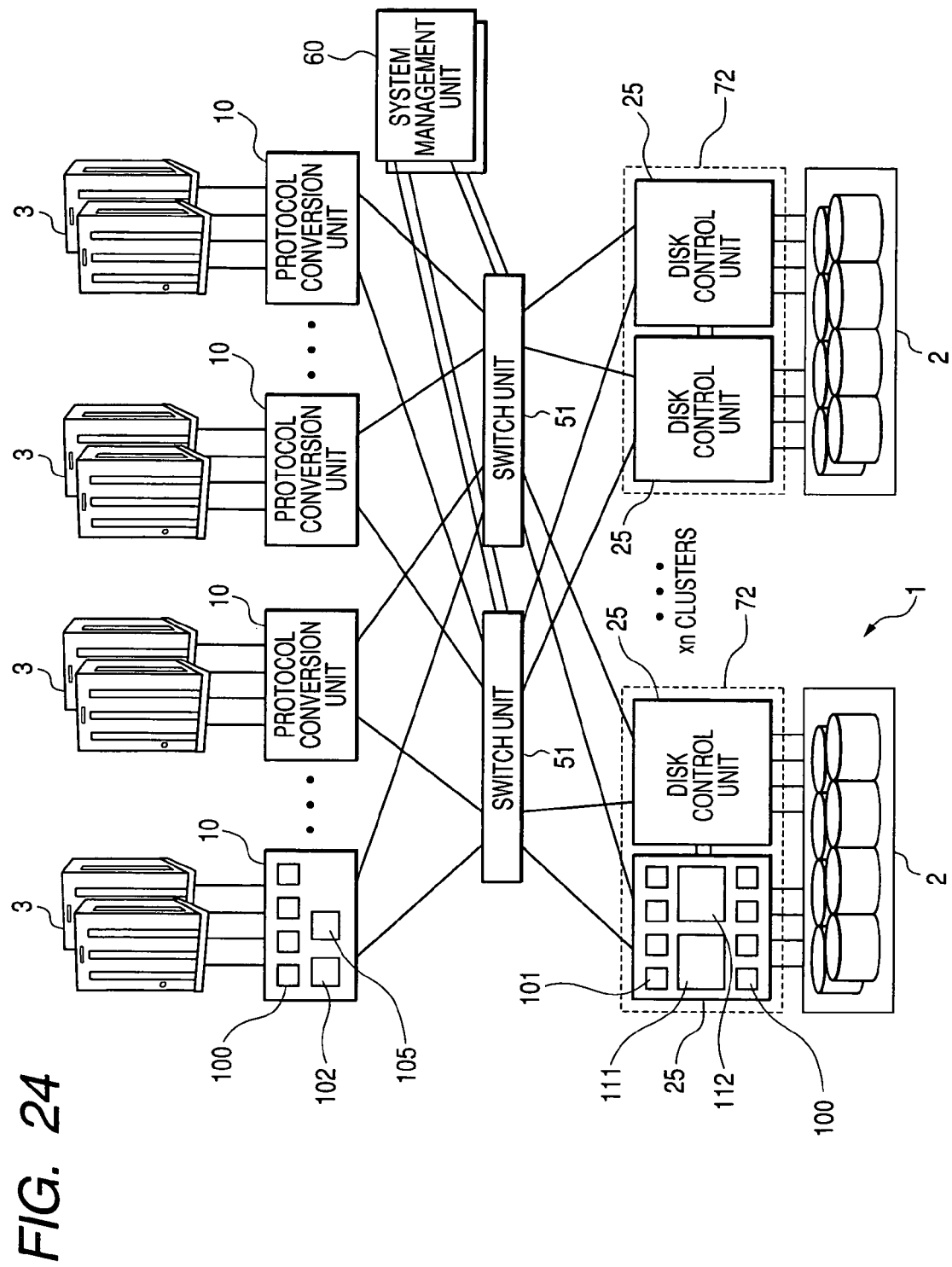
FIG. 24 is a diagram showing an example of the configuration of a storage system.

As shown in FIG. 24, the invention is implemented without problem even if the cache control units 21 and the protocol transformation units 10 are consolidated as a single control unit in a disk control unit 25 and mounted on the same board.

Figure 25:
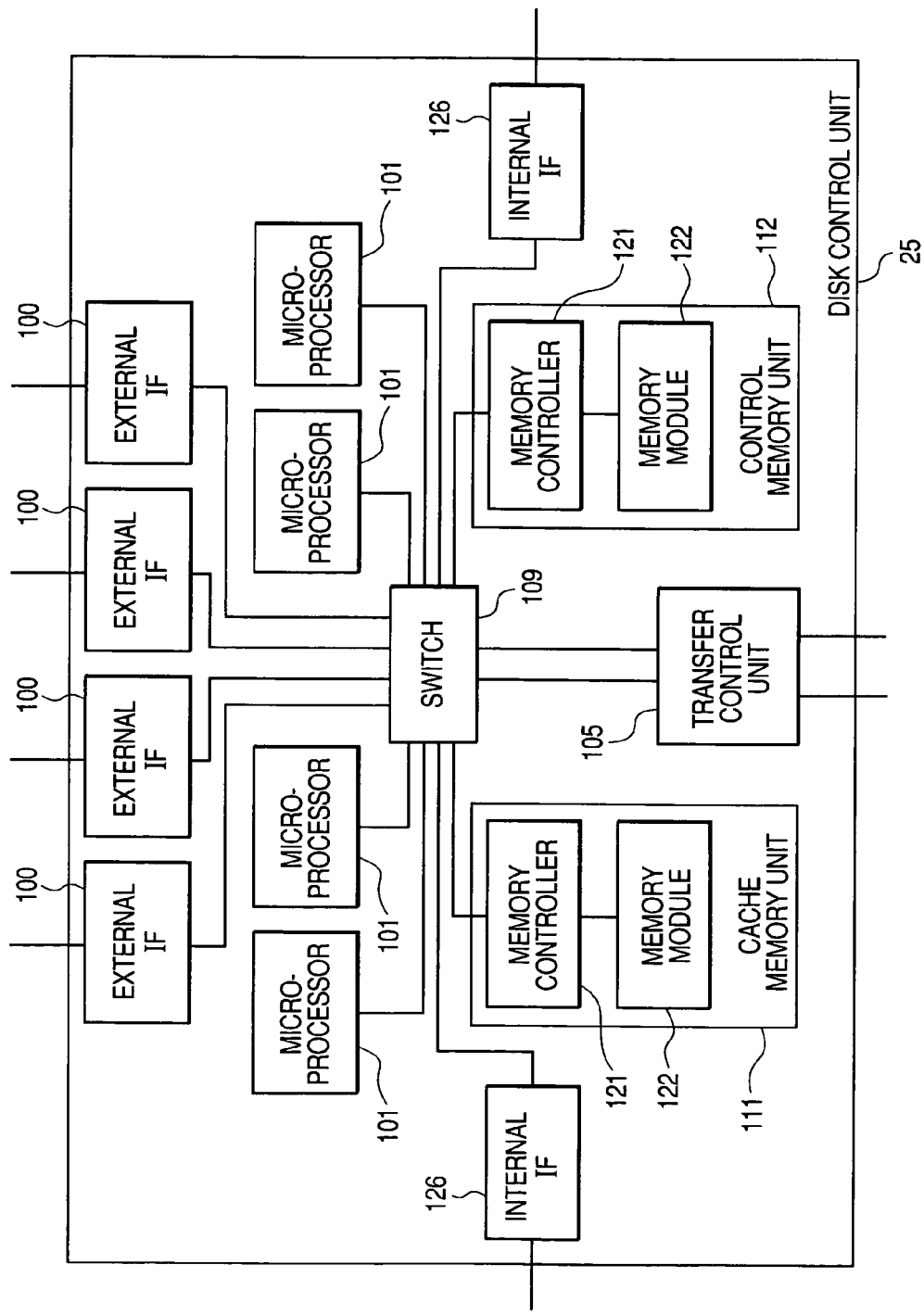
FIG. 25 is a diagram showing an example of the configuration of a disk control unit.

A specific of the disk control unit 25 is shown in FIG. 25.

The disk control unit 25 includes at least four microprocessors 101, a transfer control unit 105 that controls transfer of data/control information with the protocol transformation units 10 or the system management unit 60, four IF (external IF) 100 with the hard disk groups 2, a cache memory 111 that temporarily stores data exchanged with the servers 3 or the hard disk groups 2, and a control memory unit 112 that stores control information relating to the data transfer, the management of the cache memory unit 111, and management of the hard disk groups 2. Each of the cache memory unit 111 and the control memory unit 112 is configured from a memory module 122 and a memory controller 121 that controls access to the memory module 122. Here, there is no problem if the cache memory unit 111 and the control memory unit 112 each have the same memory controller 121 and memory module 122 and if a cache memory region and a control memory region are allocated to different regions on a single memory space. Also, each microprocessor includes a memory (not shown) connected to itself as a main memory. Alternatively, there is no problem if the four microprocessors have an SMP configuration where they share the cache memory unit 111 and the control memory unit 112 as their own main memory.

The microprocessors 101, the cache memory unit 111, the control memory unit 112, the external IF 100, and the transfer control unit 105 are connected via a switch 109. The microprocessors 101 use control information stored in the control memory unit to control the reading/writing of data to the cache memory, directory management of the cache memory, data transfer with the protocol transformation units 10 and the hard disk groups 2, and the exchange of system management information with the system management unit 60. The microprocessors 101 also execute so-called RAID processing, or redundant processing of data written to the hard disk groups 2 connected to the protocol transformation units 10.

Here, the connection configuration between the microprocessors 101, the cache memory unit 111, the control memory unit 112, the external IF 100 and the transfer control unit 105 constitutes only one example, and the configuration is not intended to be limited to the above. There is no problem as long as it has a configuration where the microprocessors 101 can control the cache memory unit 111, the control memory unit 112, the external IF 100 and the transfer control unit 105.

Also, as shown in FIG. 24, because communication of data and control information is conducted by the connection paths connecting the two disk control units 25 configuring the control cluster, two internal IF 126 are connected to the switch 109. By interconnecting the internal IF 126 of the two disk control units 25 with connection paths, communication of data and control information is conducted through the connection paths. For example, doubling of information stored in the cache memory units 111 or the control memory units 112 of the two disk control units 25 is conducted via the connection paths. Thus, in a case where an error arises in one of the two disk control units 25 configuring the control cluster 72, reliability is improved because it becomes possible to continue the operation of the storage system with the other disk control unit.

As described above, by using the cache control units 21 and the protocol transformation units 10 as a single control unit, consolidating them in the disk control units 25 and mounting them on a single board, it becomes unnecessary for the cache control units 21 and the protocol transformation units 10 to communication with the switch unit 52, so that data transfer performance is improved. Also, it becomes possible to reduce the cost of the storage system because the number of parts configuring the control clusters 72 is reduced.

Figure 3:
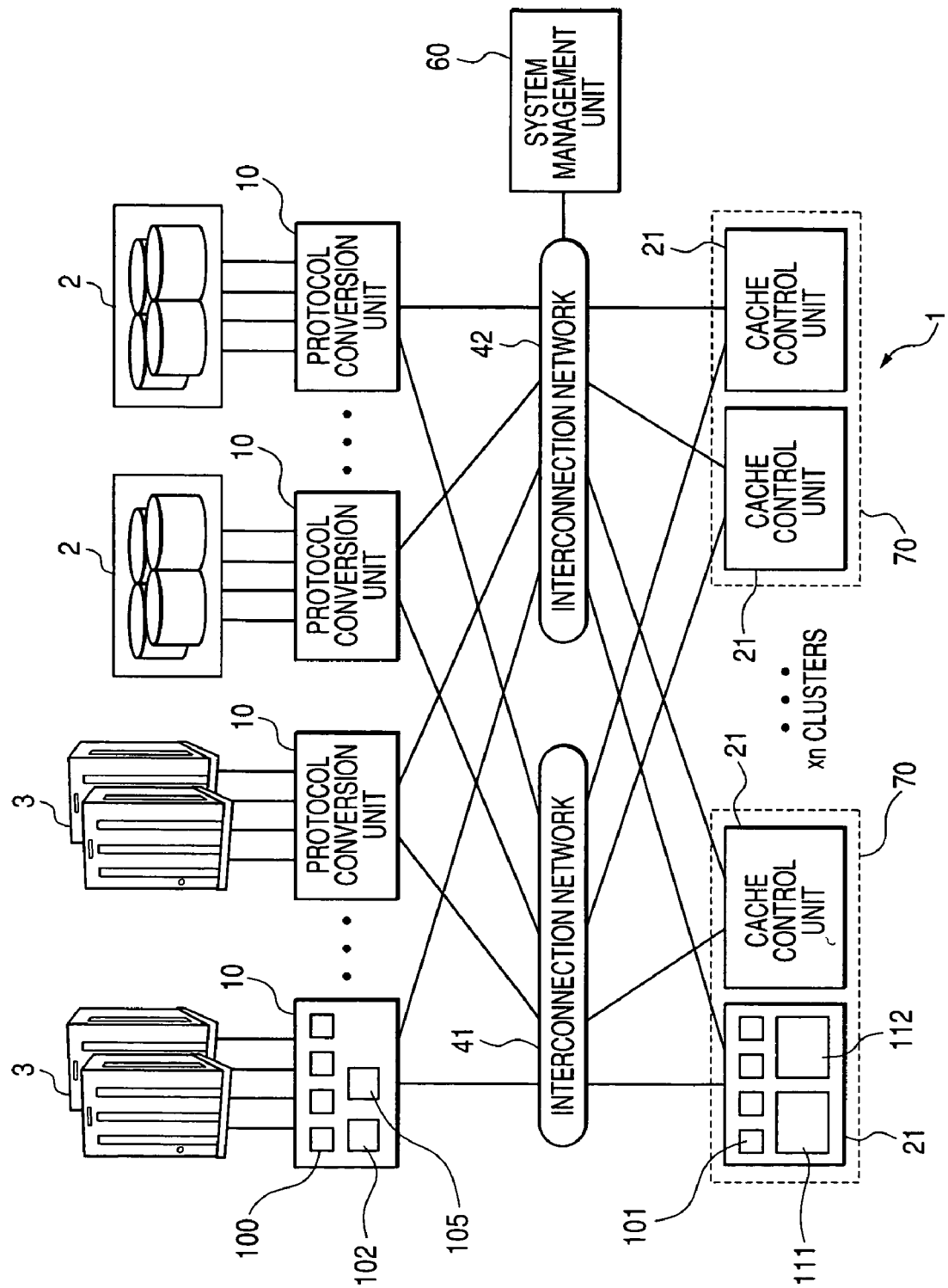
FIG. 3 is a diagram showing an example of the configuration of a storage system.

A third embodiment is shown in FIG. 3.

As shown in FIG. 3, the configuration of the storage system 1 is the same as the configuration of the first embodiment shown in FIG. 1, except that the interconnection network 31 is divided into an interconnection network 41 and an interconnection network 42, and the system management unit 60 is connected to the interconnection network 42.

The interconnection network 41 is an interconnection network dedicated to data transfer, and the interconnection network 42 is an interconnection network dedicated to the transfer of control information. Thus, the system management unit 60 conducting management of the storage system 1 is connected to the interconnection network 42.

By configuring the system in this manner, data transfer and transfer of control information no longer interfere with each other. Also, the performance of the storage system 1 is improved because it becomes possible to configure interconnection networks of a specification matching the performance demanded of the respective transfers.

The invention is implemented without problem even if the configuration of the present embodiment is applied to the configuration of the first embodiment shown in FIG. 4 or the configuration of the second embodiment shown in FIG. 5.

In the configuration of the present embodiment, effects that are the same as those of the first embodiment are obtained without problem, and it becomes possible to provide a storage system with a cost/performance meeting the system scale, from a small-scale to a large-scale configuration.

Figure 20:
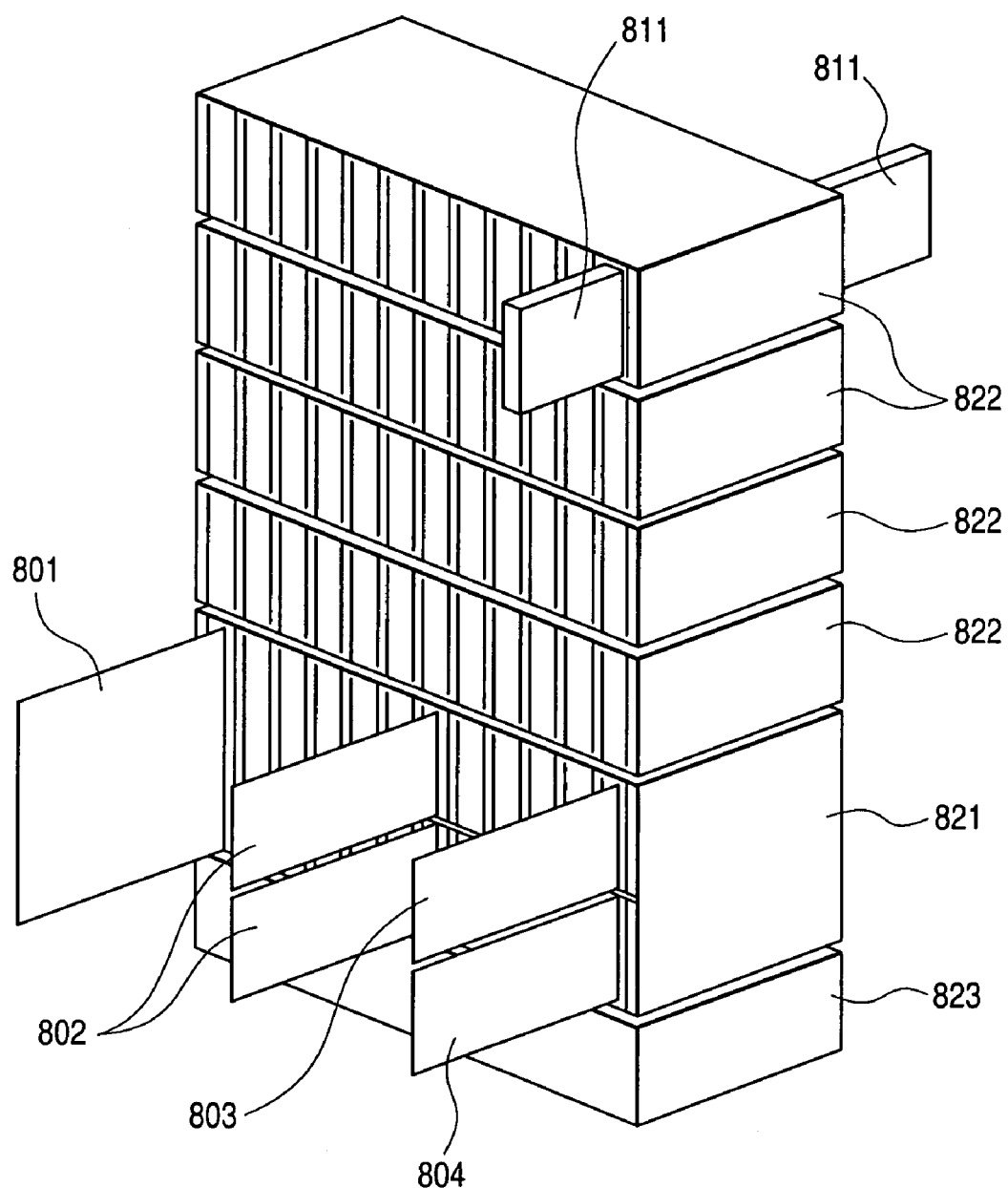
FIG. 20 is a diagram showing an example where a storage system is mounted in a casing.
Figure 21:
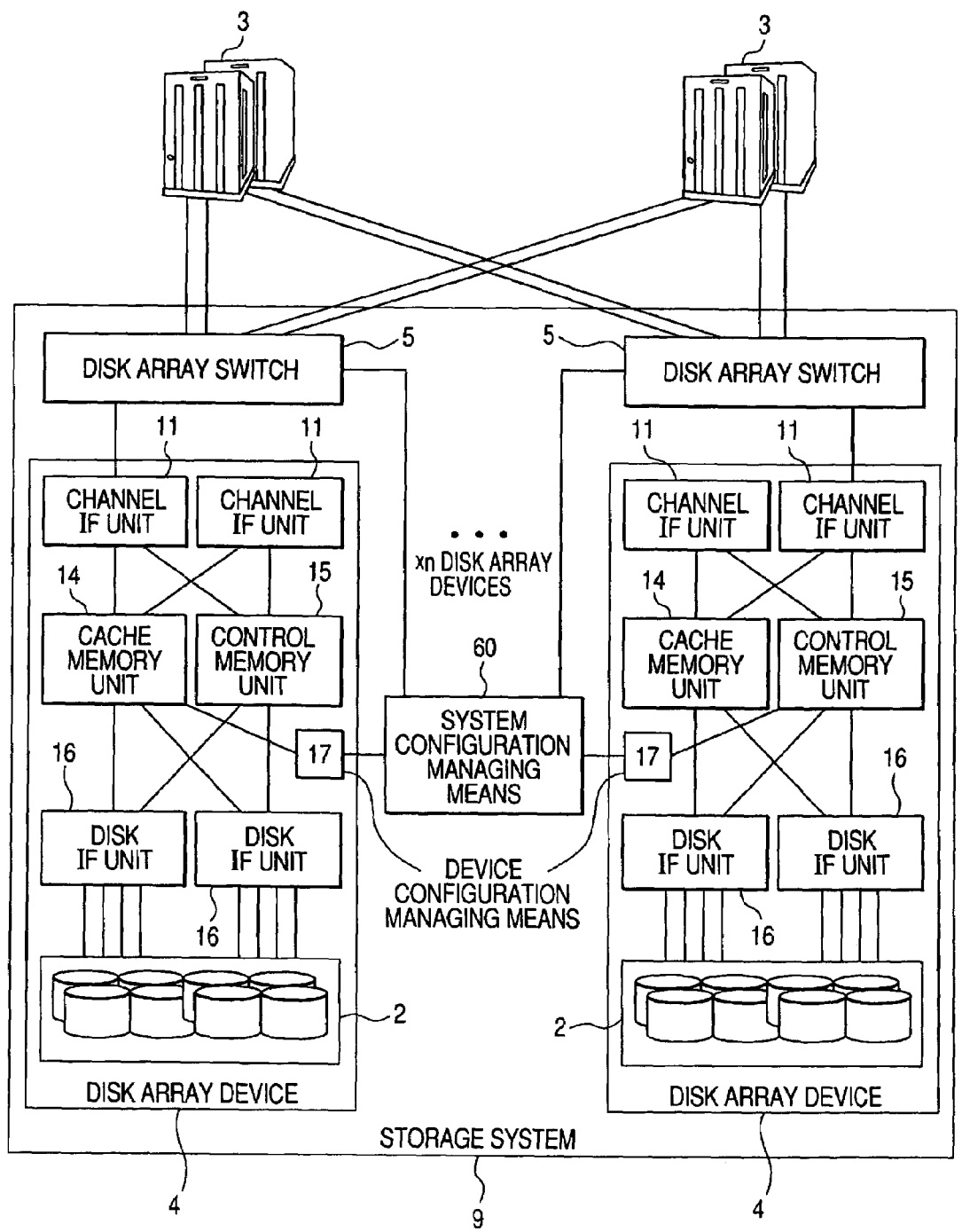
FIG. 21 is a diagram showing an example of the configuration of a conventional storage system.

An example of a configuration in a case where the storage system 1 of the configuration of the first embodiment shown in FIG. 6 or the configuration of the second embodiment shown in FIG. 7 is mounted in a casing is shown in FIG. 20.

The protocol transformation unit (PU) 10, the cache control unit (CU) 21, the system management unit (MU) 60 and the switch units 51/52 are mounted on a package and disposed in a control unit chassis 821 as PU blades 802, a CU package 801, an MU blade 804 and an SW blade 803. There is a backplane (not shown) at the rear surface of the control unit chassis 821, and each package and blade is connected to the backplane via a connector. Wiring is disposed on the backplane, whereby each package and blade is connected as in the connection configurations shown in FIGS. 6 and 7.

Here, because the number of mounted processors and the memory capacity of the cache control units 21 become larger in comparison to the protocol transformation units 10 and the system management unit, the CU package 801 has an area that is about twice that of the other blades. Also, the package and blades may use a versatile/dedicated blade server and execute dedicated software.

Four disk unit chassis 822 loaded with hard disk units 811 mounted with hard disks are disposed on the control unit chassis 821.

Also, a power unit chassis 823 accommodating a power unit supplying power to the entire storage system 1 is disposed below the control unit chassis 821.

Additionally, these chassis are accommodated inside a 19-inch rack (not shown).

It should be noted that the storage system 1 may also have a hardware configuration that does not include hard disk groups. In this case, the storage system 1 and hard disk groups located in an area separate from the storage system 1 are connected via the PU 10.

In the first embodiment, a system where the management of the cache memory units 111 was closed inside the control clusters 70 and 71 was described with respect to the storage system 1 of the configuration shown in FIGS. 1 and 4. That is, the microprocessors 101 in the cache control units 21 within a given control cluster 70 or 71 managed only the cache memory units 111 and the control memory units 112 within that control cluster 70 or 71 and did not manage the cache memory units 111 and the control memory units 112 within another control cluster 70 or 71. However, in the present embodiment (fourth embodiment), a control method will be described where the cache memory units 111 and the control memory units 112 physically divided in the plural control clusters 70 and 71 shown in FIGS. 1 and 4 are controlled by the entire storage system 1 as a single memory address space, whereby the plural cache memory units 111 and the control memory units 112 are respectively logically shared by the microprocessors 101 and 102 of the entire storage system 1.

Here, what is meant by the plural cache memory units 111 and the control memory units 112 being respectively logically shared by the microprocessors 101 and 102 of the entire storage system 1 is that a global address clearly specified in the system is physically allocated to plural memory units and each processor has that global address map, whereby all of the microprocessors 101 and 102 can access data or control information stored in whichever cache memory unit 11 or control memory unit 112.

The management configuration of the entire storage system is the same as the configuration shown in FIG. 11. Here, the logical unit allocation management table 654 showing the corresponding relation between the LU provided to the user and the cache control units 21 managing the virtual volume configuring the LU is stored in the memory of the system management unit 60.

In the first embodiment, a copy of portions of the logical unit allocation management table 654 relating to the protocol transformation units 10 was sent to the corresponding protocol transformation units 10, and the protocol transformation units 10 stored this in the memories connected to the microprocessors 102. However, in the present embodiment, distribution of the copy is not conducted. Together therewith, with respect to the operation flow at the time of system initialization shown in FIG. 16, distribution processing of the copy of the logical unit allocation management table 654 to the protocol transformation units 10 in the processing of step 709 is eliminated.

Here, in the present embodiment, an example of a case where data recorded in the storage system 1 is read from the servers 3 will be described.

First, the servers 3 issue a data read command with respect to the storage system 1. Here, command analysis processing is the same as that in the method of the first embodiment described in connection with FIG. 18. The method of request destination CA determination processing (744) thereafter is different. That is, the microprocessors 102 access the system management unit 60, reference the logical unit allocation management table 654 relating to their own protocol transformation units 10, and allocate the cache control units 21 managing the virtual volume configuring the LU in which the requested data is recorded (744). Processing thereafter (745 to 757) is the same as that in the method of the first embodiment described in connection with FIG. 18.

Next, an example of a case where data is written from the servers 3 to the storage system 1 will be described.

First, the servers 3 issue a data write command with respect to the storage system 1.

Here, command analysis processing is the same as that in the method of the first embodiment described in connection with FIG. 19. The method of request destination CA determination processing (764) thereafter is different. That is, the microprocessors 102 access the system management unit 60, reference the logical unit allocation management table 654 relating to their own protocol transformation units 10, and allocate the cache control units 21 managing the virtual volume configuring the LU in which the requested data is recorded (764). Processing thereafter (765 to 776) is the same as that in the method of the first embodiment described in connection with FIG. 19.

In the above description, the system management unit 60 was accessed each time at the time of data reading or writing and the cache control units 21 managing the virtual volume configuring the LU to become the target of reading or writing were allocated. However, the invention is implemented without problem even if the logical unit allocation management table 654 of the entire storage system is stored in all of the control memory units 112 of the cache control units 21. In this case, the method of request destination CA determination processing (744, 764) shown in FIGS. 18 and 19 is different.

That is, each protocol transformation unit 10 predetermines the cache control units 21 sending the data read/write request due to setting from the management terminal at the time of system initialization. At this time, the number of protocol transformation units 10 allocated to the cache control units 21 is set by the cache control units 21 to become as equal as possible. By doing so, the access load on each cache control unit 21 can be made equal. In the request destination CA determination processing (744, 764), the microprocessors 102 access the predetermined cache control units 21, reference the logical unit allocation management table 654 relating to their own protocol transformation units 10, and allocate the cache control units 21 managing the virtual volume configuring the LU in which the requested data is recorded. The rest of the sequence is the same as the sequence described in connection with FIGS. 18 and 19.

Figure 18:
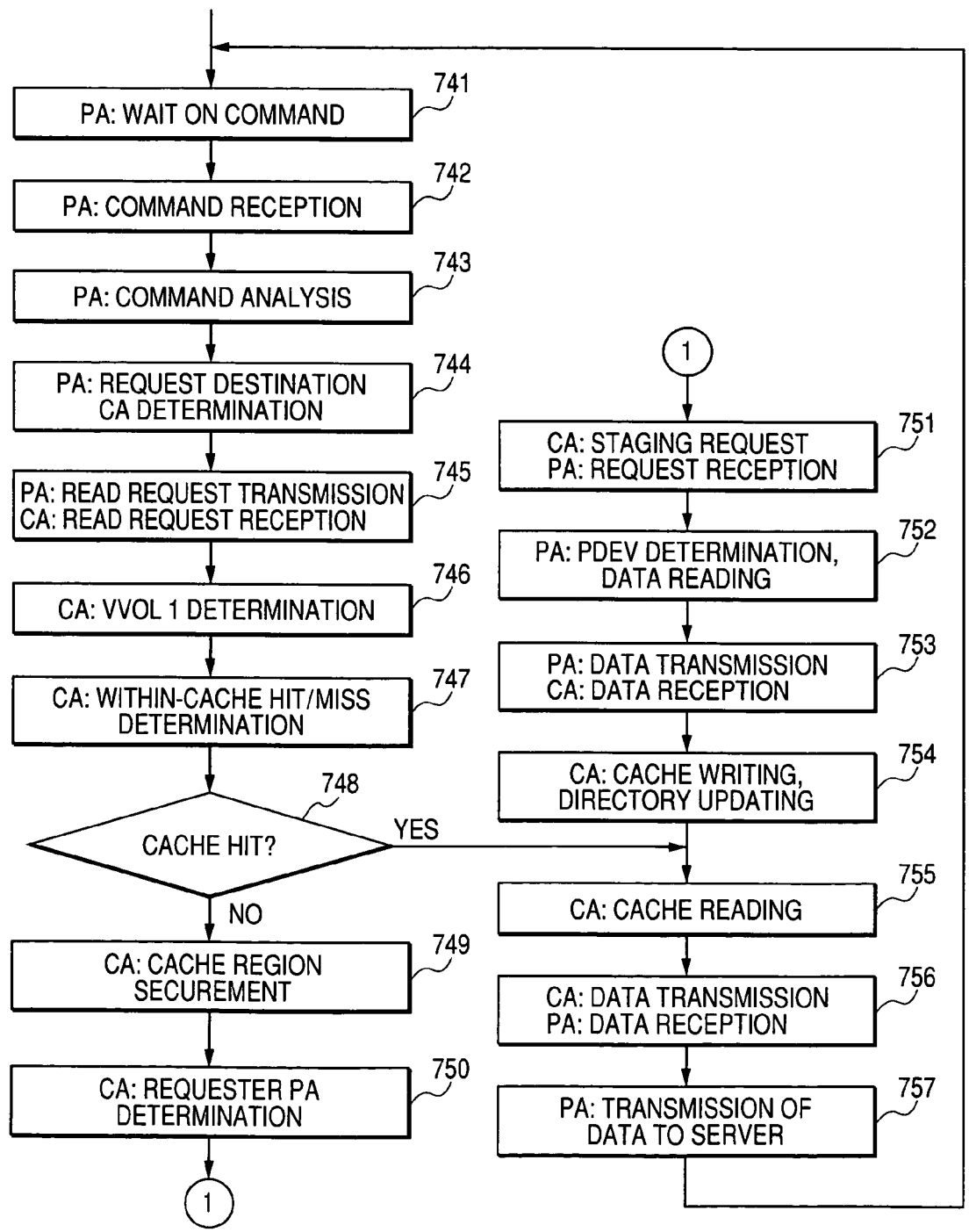
FIG. 18 is a diagram showing an example of a read operation flow.
Figure 19:
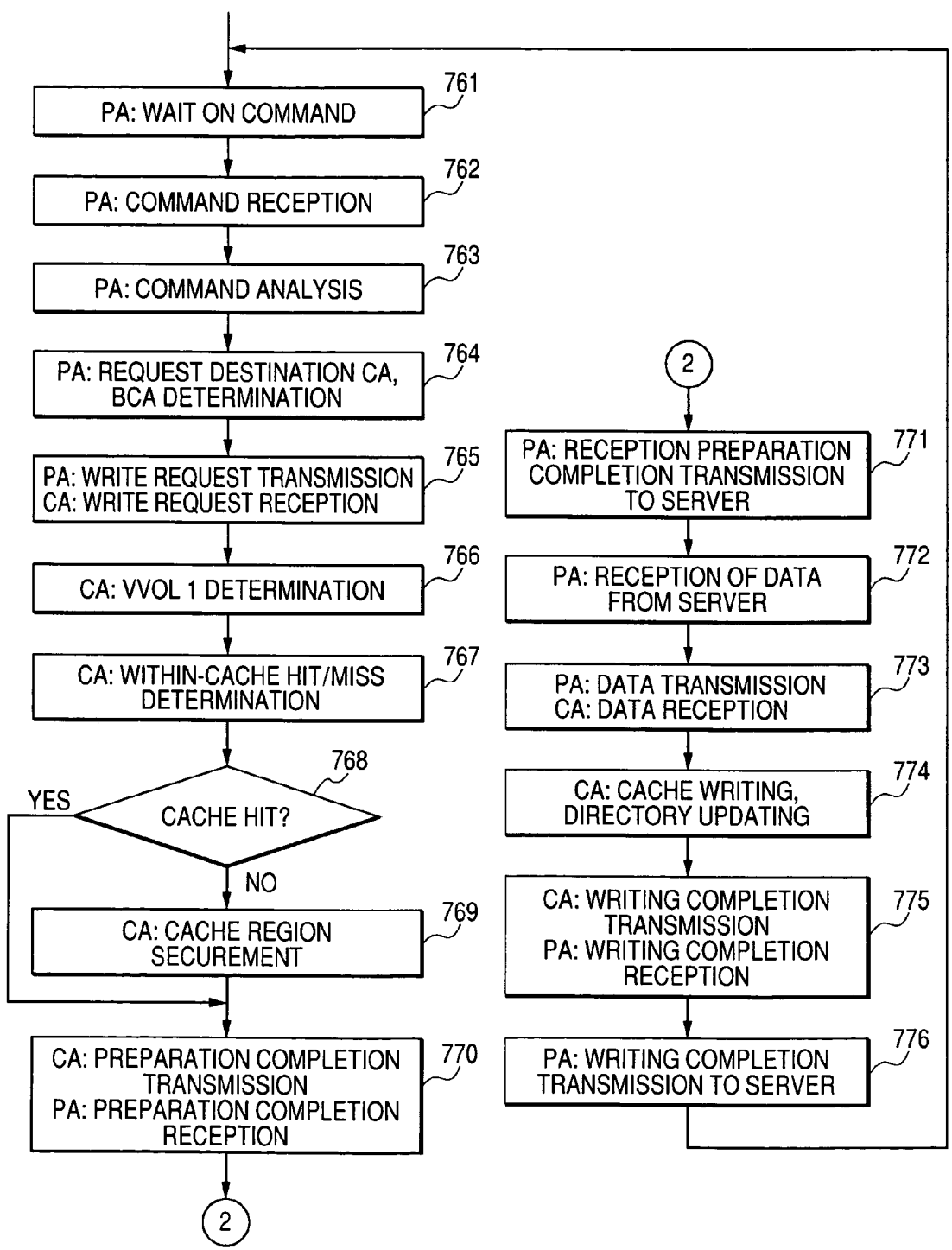
FIG. 19 is a diagram showing an example of a write operation flow.

The invention is implemented without problem even if, after command reception (742, 762) in the processing of FIGS. 18 and 19, the command is transferred to the microprocessors 101 of the cache control units 21 and command analysis (743, 763) is conducted by the microprocessors 101. In this case, in the request destination CA determination processing (744, 764), the microprocessors 101 access the predetermined cache control units 21, reference the logical unit allocation management table 654 stored in the control memory units 112, and allocate the cache control units 21 managing the virtual volume configuring the LU in which the requested data is recorded. In a case where the corresponding cache control units 21 are not the cache control units 21 to which the microprocessors 101 receiving the command belong, the microprocessors 101 access the cache memory units 111 and the control memory units 112 in the corresponding cache control units 21 and conduct processing from 745 or 765 on.

Alternatively, the command is transferred to the microprocessors 101 in the corresponding cache control units 21 and processing from 745 or 765 on is conducted by the microprocessors 101 in the corresponding cache control units 21, the cache memory units 111 and the control memory units 112.

Thus, it becomes unnecessary to dispose the microprocessors 102 in the protocol transformation units 10.

The invention is implemented without problem even if the control method of the present embodiment is applied to the configuration of the first embodiment shown in FIGS. 6 and 30, the configuration of the second embodiment shown in FIGS. 7 and 24, or the configuration of the third embodiment shown in FIG. 3.

In the configuration of the present embodiment, effects that are the same as those of the first embodiment are obtained without problem, and it becomes possible to provide a storage system with a cost/performance meeting the system scale, from a small-scale to a large-scale configuration.

Figure 28:
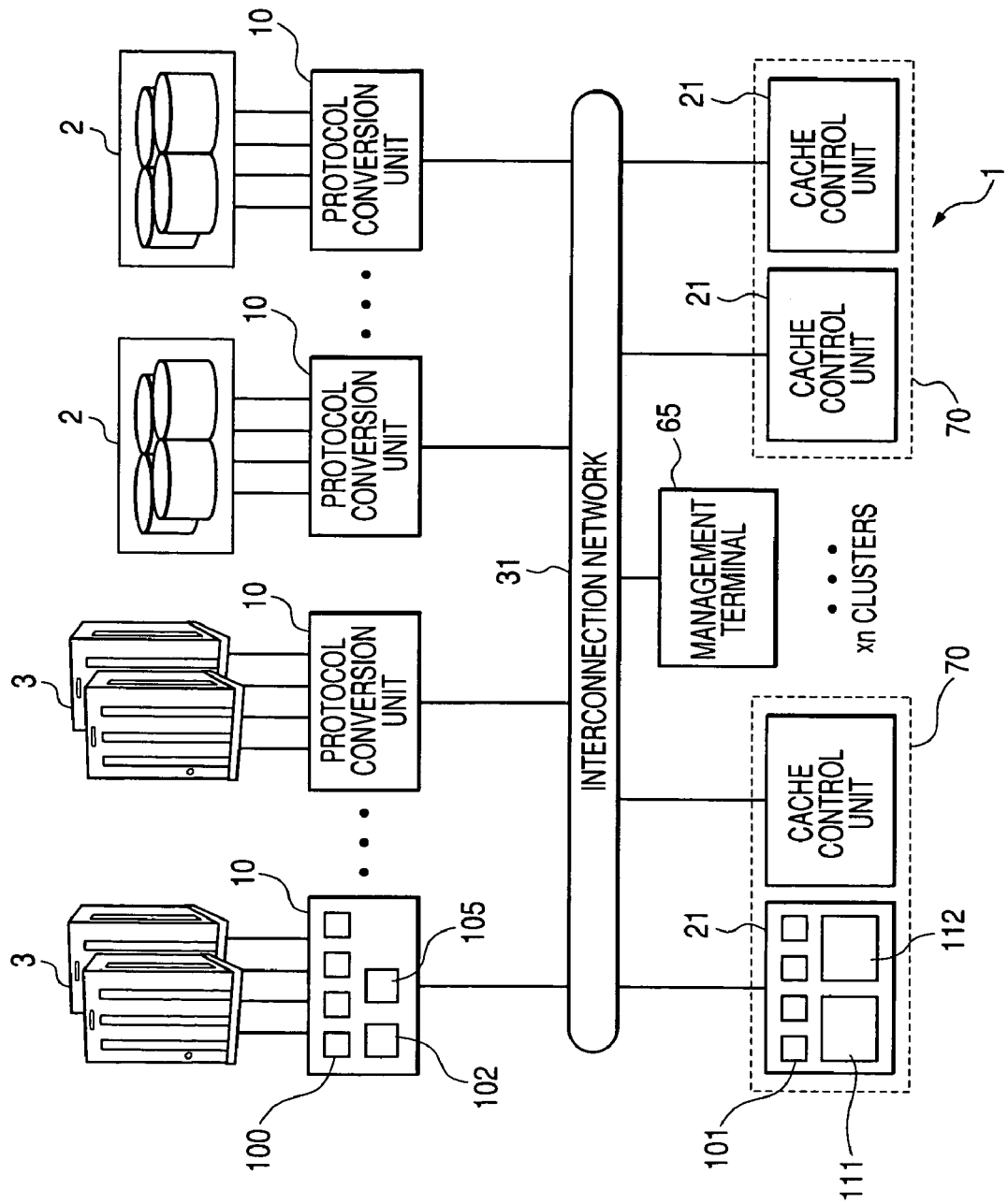
FIG. 28 is a diagram showing an example of the configuration of a storage system.
Figure 29:
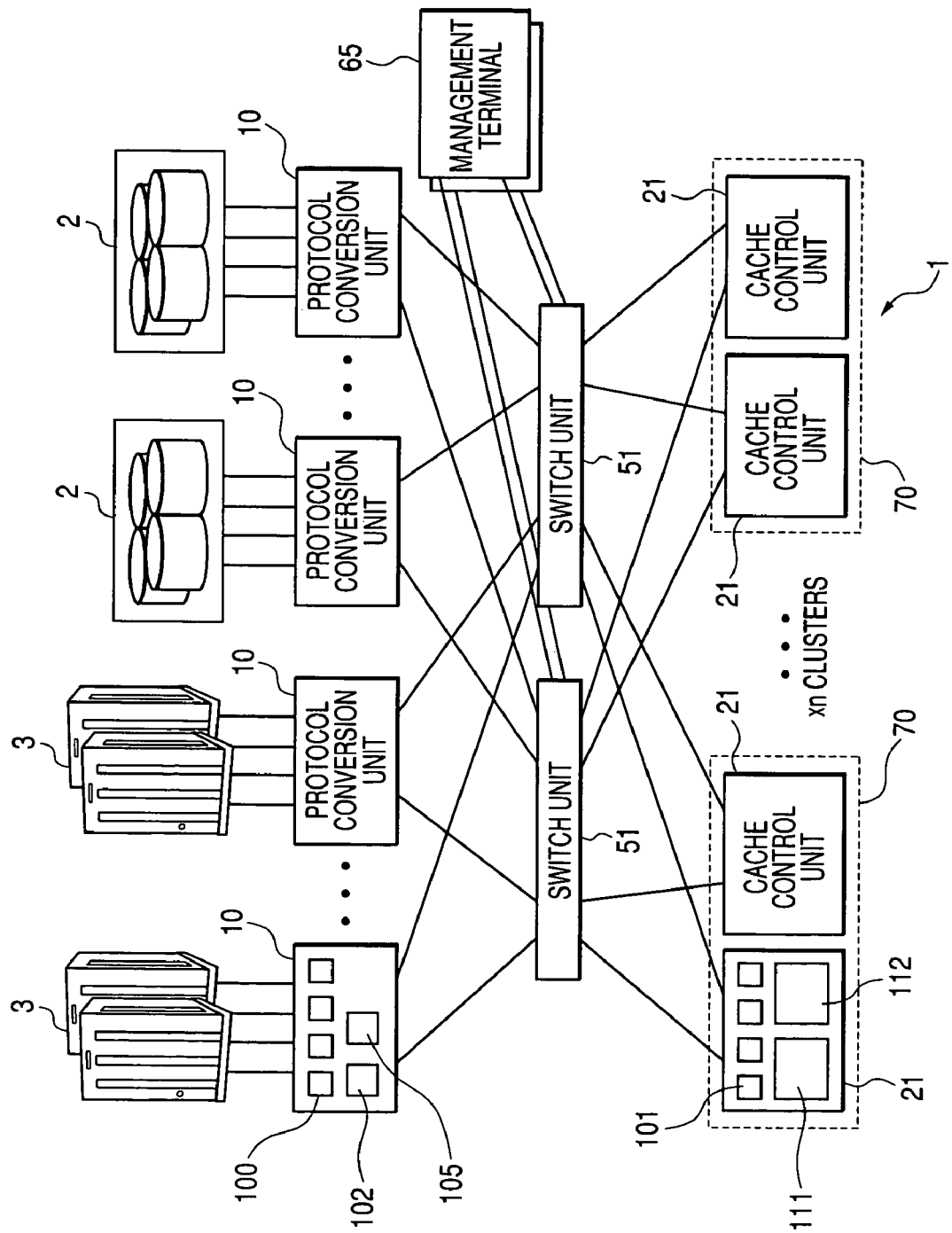
FIG. 29 is a diagram showing an example of the detailed configuration of an interconnection network.

A fifth embodiment is shown in FIGS. 28 and 29.

As shown in the drawings, the storage system 1 has the same configuration as that of the first embodiment shown in FIG. 1 and FIG. 6, except that there is no system management unit 60.

In the present embodiment, similar to the fourth embodiment, the cache memory units 111 and the control memory units 112 physically divided in the plural control clusters 70 are controlled by the entire storage system 1 as a single memory address space. Thus, the plural cache memory units 111 and the control memory units 112 are respectively logically shared by the microprocessors 101 and 102 of the entire storage system 1.

The physical device management table 651, the virtual volume management table 652, the logical unit management table 653 and the logical unit allocation management table 654 that were created in the system management unit 60 and stored in the memory thereof in the first embodiment are created by a management terminal 65 connected to each processor by the interconnection network 31 or a dedicated network such as a Local Area Network (LAN), and a copy of portions relating to each protocol transformation unit 10 and cache control unit 21 is respectively stored in the memory in the corresponding protocol transformation units 10 and cache control units 21.

In a case where the management tables are stored in the memories in this manner, the sequence of the reading and writing of data becomes the same as the sequence shown in FIGS. 18 and 19.

Also, the logical unit allocation management table 654 of the entire system may be stored in all the control memory units 112 of the cache control units 21. In this case, the method of request destination CA determination processing (744, 764) shown in FIGS. 18 and 19 is different. That is, each protocol transformation unit 10 predetermines the cache control units 21 sending the data read/write request due to setting from the management terminal at the time of system initialization. At this time, the number of protocol transformation units 10 allocated to the cache control units 21 is set by the cache control units 21 to become as equal as possible.

By doing so, the access load on each cache control unit 21 can be made equal. In the request destination CA determination processing (744, 764), the microprocessors 102 access the predetermined cache control units 21, reference the logical unit allocation management table 654 relating to their own protocol transformation units 10, and allocate the cache control units 21 managing the virtual volume configuring the LU in which the requested data is recorded. The rest of the sequence is the same as the sequence described in connection with FIGS. 18 and 19.

The invention is implemented without problem even if, after command reception (742, 762) in the processing of FIGS. 18 and 19, the command is transferred to the microprocessors 101 of the cache control units 21 and command analysis (743, 763) is conducted by the microprocessors 101. In this case, in the request destination CA determination processing (744, 764), the microprocessors 101 access the predetermined cache control units 21, reference the logical unit allocation management table 654 stored in the control memory units 112, and allocate the cache control units 21 managing the virtual volume configuring the LU in which the requested data is recorded. In a case where the corresponding cache control units 21 are not the cache control units 21 to which the microprocessors 101 receiving the command belong, the microprocessors 101 access the cache memory units 111 and the control memory units 112 in the corresponding cache control units 21 and conduct processing from 745 or 765 on.

Alternatively, the command is transferred to the microprocessors 101 in the corresponding cache control units 21 and processing from 745 or 765 on is conducted by the microprocessors 101 in the corresponding cache control units 21, the cache memory units 111 and the control memory units 112.

Thus, it becomes unnecessary to dispose the microprocessors 102 in the protocol transformation units 10.

In the configuration of the present embodiment, effects that are the same as those of the first embodiment are obtained without problem, and it becomes possible to provide a storage system with a cost/performance meeting the system scale, from a small-scale to a large-scale configuration.

According to the present invention, it becomes possible to provide a storage system where the performance bottleneck of a shared memory of a storage system are eliminated, the cost of a small-scale configuration can be reduced, and which can realize scalability of cost and performance from a small-scale to a large-scale configuration.

What is claimed is:

1. A storage system comprising:
    plural first protocol transformation units that include interfaces with an external device and transform, to a protocol within the system, a read-write protocol of data exchanged with the external device;
    plural disk devices;
    plural second protocol transformation units that include interfaces with the disk devices and transform, to the protocol within the system, a read-write protocol of data exchanged with the disk devices;
    plural cache control units that include cache memories storing data read/written with respect to the disk devices and control the cache memories;
    an interconnection network connecting the first protocol transformation units, the second protocol transformation units and the cache control units; and
    a system management unit, wherein
    the plural cache control units and the plural second protocol transformation units are divided into plural control clusters where a single control cluster includes an optional number of the cache control units and the second protocol transformation units,
    only data stored in the plural disk devices connected to the second protocol transformation units in the control clusters is stored in the cache memories of the cache control units in the control clusters,
    control of the cache memories and management of storage regions of the plural disk devices are independent inside the control clusters, and
    the system management unit manages, as a single system, the plural first protocol transformation units and the plural control clusters.

2. A storage system comprising:
    plural first protocol transformation units that include interfaces with an external device and transform, to a protocol within the system, a read-write protocol of data exchanged with the external device;
    plural disk devices;
    plural second protocol transformation units that include interfaces with the disk devices and transform, to the protocol within the system, a read-write protocol of data exchanged with the disk devices;
    plural cache control units that include cache memories storing data read/written with respect to the disk devices and control the cache memories;
    a first interconnection network connecting the first protocol transformation units and the cache control units; and
    a system management unit, wherein
    the plural cache control units and the plural second protocol transformation units are divided into plural control clusters where a single control cluster includes an optional number of the cache control units and the second protocol transformation units, the cache control units and the second protocol transformation units are interconnected in the control clusters by a second interconnection network in the control clusters, only data stored in the plural disk devices connected to the second protocol transformation units in the control clusters is stored in the cache memories of the cache control units in the control clusters, control of the cache memories and management of storage regions of the plural disk devices are independent inside the control clusters, and the system management unit manages, as a single system, the plural first protocol transformation units and the plural control clusters, wherein the first interconnection network is divided into a third interconnection network that transfers data read/written with the external device and a fourth interconnection network that transfers control information for managing the storage system, and the system management unit is connected to the fourth interconnection network.

3. The storage system according to claim 1, wherein the cache control units include processors that conduct control of the cache memories and data transfer between the first protocol transformation units and the second protocol transformation units conducted via the cache memories.

4. The storage system according to claim 1, wherein the cache control units and the second protocol transformation units are mounted on a same board.

5. The storage system according to claim 1, wherein the system management unit manages data transfer between the plural first protocol transformation units.

6. The storage system according to claim 5, wherein data of the data transfer conducted between the plural first protocol transformation units is stored in the cache memories of the cache control units.

7. The storage system according to claim 5, wherein the system management unit includes a memory, and data of the data transfer conducted between the plural first protocol transformation units is stored in the memory.

8. The storage system according to claim 5, wherein the data transfer conducted between the plural first protocol transformation units is conducted via the cache control units.

9. The storage system according to claim 1, wherein at least one external device that conducts data processing and at least one second storage system are connected to the interfaces with the external device of the plural first protocol transformation units, and input/output of data from the external device to the second storage system is conducted by conducting data transfer, via the interconnection network, between the first protocol transformation units to which the external device that conducts data processing is connected and the first protocol transformation units to which the second storage system is connected.

10. The storage system according to claim 1, wherein at least one external device that conducts data processing and at least one second storage system are connected to the interfaces with the external device of the plural first protocol transformation units, and input/output of data from the external device to the second storage system is conducted by conducting data transfer, via the first interconnection network and the cache control units, between the first protocol transformation units to which the external device is connected and the first protocol transformation units to which the second storage system is connected.

11. The storage system according to claim 9, wherein the system management unit manages, as a volume of the storage system, a logical volume that the second storage system provides, and provides the logical volume to the external device that conducts data processing.

12. The storage system according to claim 11, wherein the system management unit is divided into a first management unit that manages the interconnection network and a second management unit that manages the relation between a physical storage region in the storage system and plural types of logical storage regions, one or both of the connection relation between the external devices connected to the protocol transformation units and the relation between the external devices and the logical storage regions, and errors in the system.

13. The storage system according to claim 12, wherein the system management unit is divided into a third management unit that manages the physical connection of the interconnection network, a fourth management unit that manages logical paths between the protocol transformation units, the cache control units and the system management unit logically configured on the interconnection network.

14. The storage system according to claim 13, wherein the system management unit, the protocol transformation units and the cache control units include memories that store control information, at the time of initialization setting of the system, at least the system management unit creates a first relation table showing the relation between the plural physical storage regions and the plural types of logical storage regions and a second relation table showing one or both of the connection relation between the external devices connected to the protocol transformation units and the relation between the external devices and the logical storage regions, stores the first relation table and the second relation table in the memory in the system management unit, and distributes a copy of portions relating to the protocol transformation units or the cache control units in the first relation table and the second relation table to the related protocol transformation units or cache control units, and the protocol transformation units or the cache control units respectively store the related copy in the memories in the protocol transformation units or the cache control units.

15. The storage system according to claim 14, further comprising a management console that conducts communication with the system management unit, wherein some or all of the first relation table and the second relation table are displayed on a monitor of the management console, and the administrator sets, on the management console, the relation between the plural physical storage regions and the plural types of logical storage regions created at the time of initialization setting of the system and part or all of one or both of the connection relation between the external devices connected to the protocol transformation units and the relation between the external devices and the logical storage regions.

16. The storage system according to claim 15, wherein in the case of a read/write request from the external device, the protocol transformation units reference, with respect to the read/write request, the copy of the first relation table and the second relation table in their own memories, determine the cache control units or the protocol transformation units transferring the read/write request, and do not access the system management unit.

17. A storage system comprising:
  plural protocol transformation units that include interfaces with an external device and transform, to a protocol within the system, a read/write protocol of data exchanged with the external device;
  plural cache control units that include cache memories storing data read/written with the external device and control the cache memories; and
  an interconnection network that connects the protocol transformation units and the cache control units, wherein
  the plural cache control units are divided into plural control clusters, at least a first control portion of the plural cache control units are in a first control cluster and a second control portion of the plural cache control units are in a second control cluster, and the cache memories in the plural cache control units are logically managed in the storage system as a single cache memory so that each said protocol transformation unit can access each said cache memory of each cache control unit.

* * * * *